United States Patent
Ishida et al.

(10) Patent No.: US 10,865,782 B2
(45) Date of Patent: Dec. 15, 2020

(54) REFRIGERANT COMPRESSOR AND REFRIGERATION DEVICE INCLUDING REFRIGERANT COMPRESSOR

(71) Applicant: Panasonic Intellectual Property Management Co., Ltd., Osaka (JP)

(72) Inventors: Yoshinori Ishida, Kyoto (JP); Shingo Oyagi, Osaka (JP); Hiroyuki Fukuhara, Shiga (JP); Hirotaka Kawabata, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 15/757,932

(22) PCT Filed: Aug. 26, 2016

(86) PCT No.: PCT/JP2016/003909
§ 371 (c)(1),
(2) Date: Mar. 6, 2018

(87) PCT Pub. No.: WO2017/043036
PCT Pub. Date: Mar. 16, 2017

(65) Prior Publication Data
US 2018/0340527 A1    Nov. 29, 2018

(30) Foreign Application Priority Data

Sep. 7, 2015    (JP) .................................. 2015-175282

(51) Int. Cl.
*F01C 21/00*    (2006.01)
*F03C 2/00*    (2006.01)
(Continued)

(52) U.S. Cl.
CPC ............ *F04B 39/0292* (2013.01); *C09K 5/04* (2013.01); *C09K 5/041* (2013.01); *C09K 5/042* (2013.01);
(Continued)

(58) Field of Classification Search
CPC .... F04B 39/00; F04B 39/0215; F04B 39/023; F04B 39/0261; F04B 39/0276;
(Continued)

(56) References Cited

U.S. PATENT DOCUMENTS 3,698,204 A  * 10/1972  Schlotterbeck ........ B60H 1/321
                                                                62/206
4,972,764 A     11/1990  Ohya et al.
(Continued)

FOREIGN PATENT DOCUMENTS

CN          100410298 C       8/2008
EP          0562400 A1        9/1993
(Continued)

OTHER PUBLICATIONS

International Search Report issued for International Patent Application No. PCT/JP2016/003909, dated Nov. 15, 2016, 6 pages including English translation.
(Continued)

*Primary Examiner* — Theresa Trieu
(74) *Attorney, Agent, or Firm* — Hamre, Schumann, Mueller & Larson, P.C.

(57) ABSTRACT

A refrigerant compressor comprises an electric component; and a compression component which is driven by the electric component and compresses a refrigerant. At least one of slide members included in the compression component is made of an iron-based material. An oxide coating film (150) is provided on a slide surface of the iron-based material, the oxide coating film including a first portion
(Continued)

(151), a second portion (152), and/or a third portion (153).
The first portion (151) contains at least fine crystals (155).
The second portion (152) contains columnar grains (156).
The third portion (153) contains layered grains (157).

14 Claims, 10 Drawing Sheets

(51) Int. Cl.
| | |
|---|---|
| *F03C 4/00* | (2006.01) |
| *F04C 15/00* | (2006.01) |
| *F04C 2/00* | (2006.01) |
| *F04B 39/02* | (2006.01) |
| *F04B 35/04* | (2006.01) |
| *C09K 5/04* | (2006.01) |
| *F25B 1/00* | (2006.01) |
| *F04B 39/00* | (2006.01) |
| *C10M 171/00* | (2006.01) |
| *C10M 105/06* | (2006.01) |
| *C10M 105/32* | (2006.01) |
| *C10M 107/24* | (2006.01) |
| *F25B 31/00* | (2006.01) |
| *C10N 10/14* | (2006.01) |
| *C10N 20/06* | (2006.01) |
| *C10N 20/00* | (2006.01) |
| *C10N 30/06* | (2006.01) |
| *C10N 40/30* | (2006.01) |
| *C10N 50/00* | (2006.01) |

(52) U.S. Cl.
CPC ............ *C09K 5/045* (2013.01); *C10M 105/06* (2013.01); *C10M 105/32* (2013.01); *C10M 107/24* (2013.01); *C10M 171/008* (2013.01); *F04B 35/04* (2013.01); *F04B 39/00* (2013.01); *F04B 39/02* (2013.01); *F04B 39/023* (2013.01); *F04B 39/0261* (2013.01); *F04B 39/0276* (2013.01); *F25B 1/00* (2013.01); *F25B 31/002* (2013.01); *C09K 2205/106* (2013.01); *C09K 2205/12* (2013.01); *C09K 2205/122* (2013.01); *C09K 2205/126* (2013.01); *C10M 2201/0623* (2013.01); *C10M 2201/1006* (2013.01); *C10M 2203/065* (2013.01); *C10M 2203/1006* (2013.01); *C10M 2207/2805* (2013.01); *C10M 2209/043* (2013.01); *C10M 2209/1033* (2013.01); *C10N 2010/14* (2013.01); *C10N 2020/06* (2013.01); *C10N 2020/101* (2020.05); *C10N 2020/103* (2020.05); *C10N 2020/106* (2020.05); *C10N 2030/06* (2013.01); *C10N 2040/30* (2013.01); *C10N 2050/023* (2020.05); *F04B 39/0215* (2013.01); *F05C 2203/08* (2013.01); *F05C 2253/08* (2013.01); *F05C 2253/12* (2013.01)

(58) Field of Classification Search
CPC ...... F04B 39/0292; F04B 39/02; F04B 35/04; F25B 1/00; F25B 31/002; F05C 253/12; F05C 2253/08; F05C 2203/08; C10M 171/008; C10M 2201/0623; C10M 2201/1006; C10M 2203/065; C10M 2203/1006; C10M 2207/2805; C10M 2209/043; C10M 2209/1033; C10M 107/24; C10M 105/06; C10M 105/32; C10N 2210/08; C10N 2220/082; C10N 2220/302; C10N 2220/303; C10N 2220/306; C10N 2230/06; C10N 240/30; C10N 2250/14; C09K 5/04; C09K 5/041; C09K 5/042; C09K 5/045; C09K 2205/126; C09K 2205/122; C09K 2205/12; C09K 2205/106
USPC .................................... 418/178–179
See application file for complete search history.

(56) References Cited

U.S. PATENT DOCUMENTS

| | | | |
|---|---|---|---|
| 5,263,834 A | | 11/1993 | Sato et al. |
| 5,364,248 A | * | 11/1994 | Nakashima ......... F04C 2230/91 418/178 |
| 5,531,574 A | | 7/1996 | Honma |
| 2005/0257684 A1 | | 11/2005 | Sugiura et al. |
| 2013/0167580 A1 | | 7/2013 | Ishida et al. |

FOREIGN PATENT DOCUMENTS

| | | |
|---|---|---|
| EP | 0978655 A1 | 2/2000 |
| EP | 2818716 | 12/2014 |
| JP | H05271928 A | 10/1993 |
| JP | H07238885 A | 9/1995 |
| JP | 11-61376 | 3/1999 |
| JP | 2001050179 A | 2/2001 |
| JP | 2010077863 A | 4/2010 |
| JP | 2013-217302 | 10/2013 |
| WO | 2012032765 A1 | 3/2012 |

OTHER PUBLICATIONS

Office Action issued for Chinese Patent Application No. 201680051840. 8, dated Nov. 21, 2018, 12 pages including English translation.
European Search Report issued in European Application No. 16843906.5 dated Jun. 26, 2018 (10 pages).
Bertrand et al.: "iron Oxidation at low temperature (260-500° C.) in Air and the Effect of Water Vapor"; Oxidation of Metals, Kluwer Academic Publishers-Plenum Publishers, 2009, vol. 73, pp. 139-162.
Rashmi Piparsania: "High Temparature Oxidation of Cast Iron"; Department of Physics, University of Roorke, 1998, 97 pages, retrieved from the internet: shodhbhagirathi.iitr.ac.in:8081/xmlui/bitstream/handle/123456789/3836/PHD245021.pdf?sequenec=1 &is Allowed=y.
Takeda et al: "Physical Properties of Iron-Oxide Scales on Si-Containing Steels at High Temperature"; Material Transactions, 2009, vol. 50, pp. 2242-2246.

\* cited by examiner

Fig. 5

Abrasion amount of disc

| | |
|---|---|
| Prior art example<br>Phosphate coating film | (rightmost) |
| Comparative example 1<br>Oxide coating film of single layer containing layered grains | (middle) |
| Comparative example 2<br>Oxide coating film including two layers containing layered grains and columnar grains | (left) |
| Example 1<br>Oxide coating film of the present disclosure | (left) |

Fig. 6

Abrasion amount of ring

| | |
|---|---|
| Prior art example<br>Phosphate coating film | (left) |
| Comparative example 1<br>Oxide coating film of single layer containing layered grains | (left) |
| Comparative example 2<br>Oxide coating film including two layers containing layered grains and columnar grains | (middle) |
| Example 1<br>Oxide coating film of the present disclosure | (left) | ature REFRIGERANT COMPRESSOR AND
REFRIGERATION DEVICE INCLUDING
REFRIGERANT COMPRESSOR

TECHNICAL FIELD

The present invention relates to a refrigerant compressor for use with a refrigerator, an air conditioner, or the like, and a refrigeration device including the refrigerant compressor.

BACKGROUND ART

In recent years, for the purpose of global environment conservation, a refrigerant compressor with a higher efficiency, which can reduce the use of fossil fuel, has been developed.

One approach for achievement of the higher efficiency of the refrigerant compressor is, for example, formation of a phosphate coating film on a slide surface of a slide section such as a piston or a crankshaft to prevent abrasion of the slide section. By forming this phosphate coating film, unevenness of the processed surface of a machine processing finish can be removed, and initial conformability between slide members can be improved (e.g., see Patent Literature 1).

FIG. 11 is a cross-sectional view of a conventional refrigerant compressor disclosed in Patent Literature 1. As shown in FIG. 11, a sealed container 1 is an outer casing of the refrigerant compressor. Lubricating oil 2 is reserved in the bottom portion of the sealed container 1. The sealed container 1 accommodates therein an electric component 5 including a stator 3 and a rotor 4, and a reciprocating compression component 6 driven by the electric component 5.

The compression component 6 includes a crankshaft 7, a cylinder block 11, a piston 15, and the like. The configuration of the compression component 6 will be described below.

The crankshaft 7 includes at least a main shaft section 8 to which the rotor 4 is pressingly secured, and an eccentric shaft 9 which is provided eccentrically with the main shaft section 8. The crankshaft 7 is provided with an oil feeding pump 10.

The cylinder block 11 forms a compression chamber 13 including a bore 12 with a substantially cylindrical shape and includes a bearing section 14 supporting the main shaft section 8.

The piston 15 is loosely fitted into the bore 12 with a clearance. The piston 15 is coupled to the eccentric shaft 9 via a connecting rod 17 as a coupling means by use of a piston pin 16. The end surface of the bore 12 is closed by a valve plate 18.

A head 19 is secured to the valve plate 18 on a side opposite to the bore 12. The head 19 constitute a high-pressure chamber. A suction tube 20 is secured to the sealed container 1 and connected to a low-pressure side (not shown) of a refrigeration cycle. The suction tube 20 leads a refrigerant gas (not shown) to the inside of the sealed container 1. A suction muffler 21 is retained between the valve plate 18 and the head 19.

The main shaft section 8 of the crankshaft 7 and the bearing section 14, the piston 15 and the bore 12, the piston pin 16 and the connecting rod 17, the eccentric shaft 9 of the crankshaft 7 and the connecting rod 17 constitute slide sections.

In a combination of the iron-based materials among the slide members constituting the slide sections, as described above, an insoluble phosphate coating film comprising a porous crystalline body is provided on the slide surface of one of the iron-based materials.

Next, the operation of the sealed compressor having the above-described configuration will be described. Electric power is supplied from a power supply utility (not shown) to the electric component 5, to rotate the rotor 4 of the electric component 5. The rotor 4 rotates the crankshaft 7. By an eccentric motion of the eccentric shaft 9, the piston 15 is driven via the connecting rod 17 as a coupling means and the piston pin 16. The piston 15 reciprocates inside the bore 12. By the reciprocating motion of the piston 15, a refrigerant gas is led to the inside of the sealed container 1 through the suction tube 20, suctioned from the suction muffler 21 into the compression chamber 13, and compressed inside the compression chamber 13 in succession.

According to the rotation of the crankshaft 7, the lubricating oil 2 is fed to the slide sections by the oil feeding pump 10, and lubricates each of the slide sections. In addition, the lubricating oil 2 serves to seal a gap formed between the piston 15 and the bore 12.

The main shaft section 8 of the crankshaft 7 and the bearing section 14 perform a rotation. While the refrigerant compressor is stopped, a rotational speed is 0 m/s. During start-up of the refrigerant compressor, the rotation starts in a state in which the metals are in contact with each other, and a great frictional resistance force is generated. In this refrigerant compressor, the phosphate coating film is provided on the main shaft section 8 of the crankshaft 7, and has an initial conformability. In this structure, the phosphate coating film can prevent an abnormal abrasion caused by the contact between the metals during start-up of the refrigerant compressor.

CITATION LIST

Patent Literature

Patent Literature 1: Japanese-Laid Open Patent Application Publication No. Hei. 7-238885

SUMMARY OF INVENTION

Technical Problem

In recent years, to provide higher efficiency of the refrigerant compressor, the lubricating oil 2 with a lower viscosity is used, or a slide length of the slide sections (a distance for which the slide sections slide) is designed to be shorter. For this reason, the conventional phosphate coating film is likely to be abraded or worn out at earlier time and it may be difficult to maintain the conformability between the slide surfaces. As a result, the abrasion resistance of the phosphate coating film may be degraded.

In the refrigerant compressor, while the crankshaft 7 is rotating once, a load applied to the main shaft section 8 of the crankshaft 7 is significantly changed. With this change in the load, the refrigerant gas dissolved into the lubricating oil 2 is evaporated into bubbles, in a region between the crankshaft 7 and the bearing section 14. The bubbles cause an oil film to run out, and the contact between the metals occurs more frequently.

As a result, the phosphate coating film provided on the main shaft section 8 of the crankshaft 7 is likely to be abraded at earlier time and a friction coefficient is likely to be increased. With the increase in the friction coefficient, the slide section generates more heat, and thereby abnormal abrasion such as adhesion may occur. A similar phenomenon may occur in the region between the piston 15 and the bore 12. Therefore, the piston 15 and the bore 12 have the same problem as that occurring in the crankshaft 7.

The present invention has been developed to solve the above described problem associated with the prior art, and an object of the present invention is to provide a refrigerant compressor which can improve an abrasion resistance of a slide member, to realize high reliability and high efficiency, and a refrigeration device including the refrigerant compressor.

Solution to Problem

To achieve the above-described object, a refrigerant compressor according to the present invention comprises an electric component; and a compression component which is driven by the electric component and compresses a refrigerant, wherein at least one of slide members included in the compression component is made of an iron-based material, and an oxide coating film is provided on a slide surface of the iron-based material, the oxide coating film including a first portion containing at least fine crystals, a second portion containing columnar grains, and/or a third portion containing layered grains.

In accordance with this configuration, the slide member can improve the abrasion resistance of this slide member and suppress an attacking characteristic with respect to the other member (sliding between the slide member and the other member occurs). In addition, the slide member can improve adhesivity between the base material and the oxide coating film. Therefore, the viscosity of lubricating oil can be reduced, and the slide length of slide sections (a distance for which the slide sections slide) can be designed to be shorter. Since a sliding loss of the slide section can be reduced, the refrigerant compressor can realize high efficiency and performance, and secure long-time reliability.

To solve the above-described problem, a refrigerant compressor comprises a refrigerant circuit including the refrigerant compressor having the above-described configuration, a heat radiator, a pressure reducing unit, and a heat absorber, which are annularly coupled to each other via a pipe.

In accordance with this configuration, the refrigeration device includes the refrigerant compressor with higher efficiency. Therefore, electric power consumption of the refrigeration device can be reduced, and energy-saving can be realized.

The above and further objects, features and advantages of the present invention will more fully be apparent from the following detailed description of preferred embodiments with reference to accompanying drawings.

Advantageous Effects of Invention

The present invention has advantages in that with the above described configuration, it becomes possible to provide a refrigerant compressor which can improve an abrasion resistance of a slide member, to realize high reliability and high efficiency, and a refrigeration device including the refrigerant compressor.

BRIEF DESCRIPTION OF DRAWINGS

FIG. 5 is a view showing the abrasion amounts of discs in conjunction with the oxide coating film according to Embodiment 1, after a ring on disc abrasion test is conducted.

FIG. 6 is a view showing the abrasion amounts of rings in conjunction with the oxide coating film according to Embodiment 1, after the ring on disc abrasion test is conducted.

DESCRIPTION OF EMBODIMENTS

Figure 1:
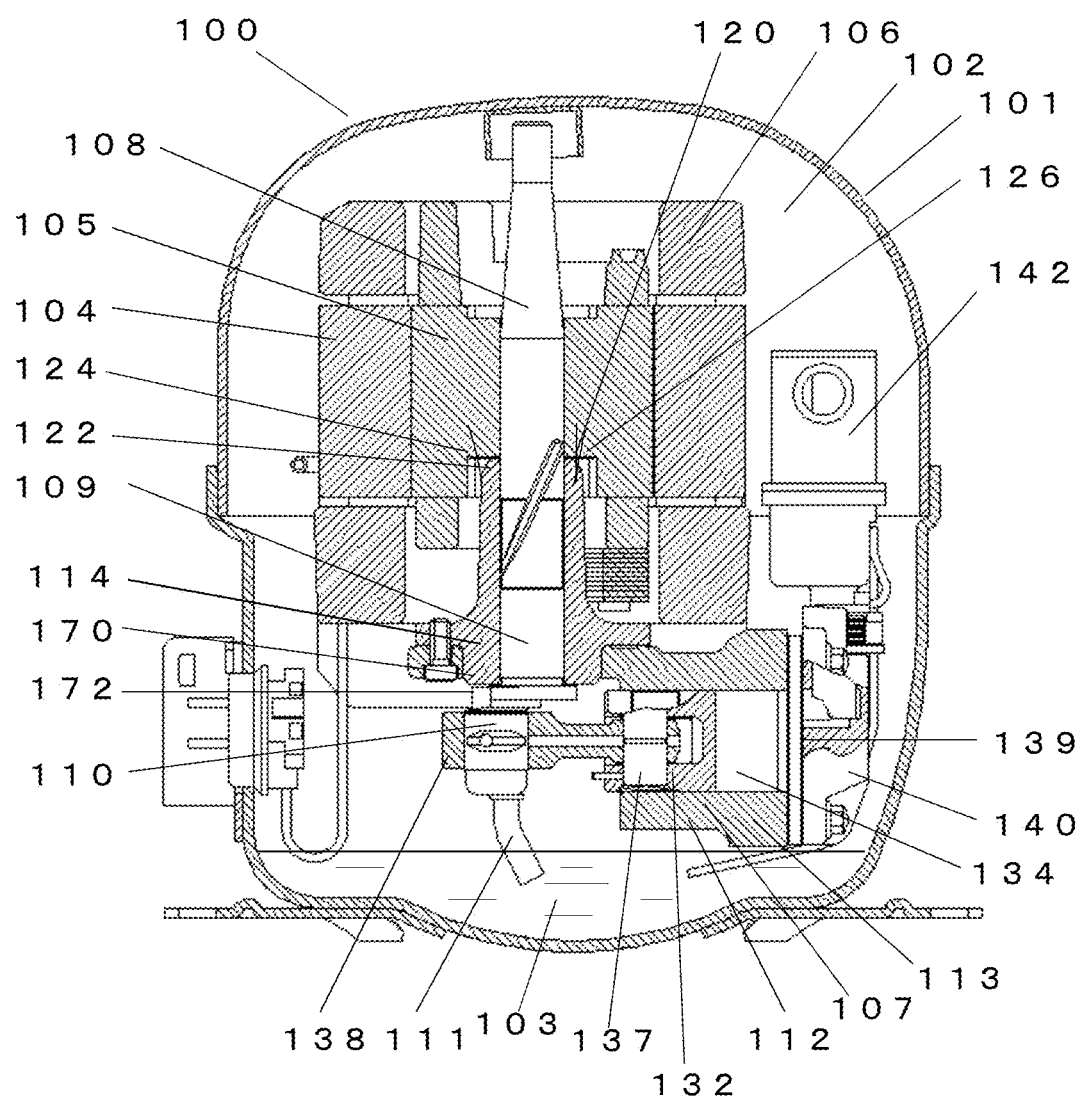
FIG. 1 is a schematic cross-sectional view of a refrigerant compressor according to Embodiment 1 of the present disclosure.

According to the present disclosure, a refrigerant compressor comprises an electric component; and a compression component which is driven by the electric component and compresses a refrigerant, wherein at least one of slide members included in the compression component is made of an iron-based material, and an oxide coating film is provided on a slide surface of the iron-based material, the oxide coating film including a first portion containing at least fine crystals, a second portion containing columnar grains, and/or a third portion containing layered grains.

In accordance with this configuration, the slide member can improve the abrasion resistance of this slide member and suppress an attacking characteristic with respect to the other member (sliding between the slide member and the other member occurs). In addition, the slide member can improve adhesivity between the base material and the oxide coating film. Therefore, the viscosity of lubricating oil can be reduced, and the slide length of slide members (a distance for which the slide members slide) constituting the slide sections can be designed to be shorter. Since a sliding loss of the slide sections can be reduced, the refrigerant compressor can realize high efficiency and performance, and secure long-time reliability.

In the refrigerant compressor having the above-described configuration, the oxide coating film may comprise at least the first portion located in an outermost surface of the oxide coating film, the second portion located under the first portion, and the third portion located under the second portion.

In this structure, the slide member can further improve the abrasion resistance, and more effectively suppress the attacking characteristic with respect to the other member (sliding between the slide member and the other member occurs). As a result, the refrigerant compressor can realize a high performance and secure long-time reliability.

In the refrigerant compressor having the above-described configuration, the first portion may have a crystal grain size (grain diameter) in a range of 0.001 to 1 µm, and the crystal grain size of the first portion may be smaller than that of the second portion.

In this structure, the first portion has a structure with a high oil retaining capability. For example, even in a state in which the slide member slides under a condition in which oil is insufficient (oil is not sufficiently fed to the slide member), formation of an oil film on the slide surface can be facilitated. Therefore, the abrasion resistance of the slide member can be improved.

In the refrigerant compressor having the above-described configuration, the first portion may include at least a first a portion and a first b portion which are different from each other in crystal density.

In this structure, the first portion has a structure with a high oil retaining capability. Even in a state in which the slide member slides under a condition in which oil is insufficient (oil is not sufficiently fed to the slide member), formation of the oil film on the slide surface can be facilitated. Therefore, the abrasion resistance of the slide member can be improved.

In the refrigerant compressor having the above-described configuration, the first a portion may be located closer to an outermost surface of the oxide coating film, the first b portion may be located under the first a portion, and the crystal density of the first a portion may be lower than that of the first b portion.

In this structure, the first portion can have a high oil retaining capability because of the first a portion, and the first b portion can sufficiently support the first a portion.

In the refrigerant compressor having the above-described configuration, the first a portion may comprise needle-shaped grains which are vertically elongated and have an aspect ratio in a range of 1 to 1000.

In this structure, it becomes possible to improve the conformability of the slide surface of the slide member with respect to the slide surface of the other member (sliding between the slide member and the other member occurs).

In the refrigerant compressor having the above-described configuration, the second portion may contain crystal grains which are vertically elongated and have an aspect ratio in a range of 1 to 20.

In this structure, the second portion contains the grains in which the vertically elongated crystals which are substantially perpendicular to a sliding direction are densely arranged. Since the mechanical characteristic of the second portion can be improved, the durability of the oxide coating film can be further improved.

In the refrigerant compressor having the above-described configuration, the third portion may contain crystal grains which are horizontally elongated and have an aspect ratio in a range of 0.01 to 1.

In this structure, the third portion contains the grains in which the horizontally elongated crystals which are substantially parallel to the sliding direction are densely arranged. Since the third portion can have a slippage characteristic, peeling resistance and adhesivity of the oxide coating film can be improved. As a result, the durability of the oxide coating film can be further improved.

In the refrigerant compressor having the above-described configuration, the oxide coating film may contain iron, oxygen and silicon.

In this structure, since the mechanical strength, the peeling resistance, and the adhesivity of the oxide coating film are high, the durability of the oxide coating film can be improved.

In the refrigerant compressor having the above-described configuration, the oxide coating film may have a thickness in a range of 1 to 5 µm.

In this structure, the abrasion resistance and long-time reliability of the slide member can be improved, and dimension accuracy of the slide member can be stabilized. As a result, productivity of the refrigerant compressor can be improved.

In the refrigerant compressor having the above-described configuration, the refrigerant may be a HFC-based refrigerant such as R134a, or a mixed refrigerant including any of HFC-based refrigerants, and the lubricating oil may be one of ester oil, alkylbenzene oil, polyvinyl ether, and polyalkylene glycol, or mixed oil including any of ester oil, alkylbenzene oil, polyvinyl ether, and polyalkylene glycol.

Even in a case where the lubricating oil with a low viscosity is used, the abnormal abrasion of the slide member can be prevented. In addition, the sliding loss of the slide member can be reduced. Therefore, the refrigerant compressor can improve reliability and realize high efficiency.

In the refrigerant compressor having the above-described configuration, the refrigerant may be a natural refrigerant such as R600a, R290, or R744, or a mixed refrigerant including any of the natural refrigerants, and the lubricating oil may be one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol.

Even in a case where the lubricating oil with a low viscosity is used, the abnormal abrasion of the slide member can be prevented. In addition, the sliding loss of the slide member can be reduced. Therefore, the refrigerant compressor can improve reliability and realize high efficiency. Furthermore, by use of the refrigerant which produces less greenhouse effect, global warming can be suppressed.

In the refrigerant compressor having the above-described configuration, the refrigerant may be a HFO-based refrigerant such as R1234yf, or a mixed refrigerant of HFO-based refrigerants, and the lubricating oil may be one of ester oil, alkylbenzene oil, polyvinyl ether, and polyalkylene glycol, or mixed oil including any of ester oil, alkylbenzene oil, polyvinyl ether, and polyalkylene glycol.

Even in a case where the lubricating oil with a low viscosity is used, the abnormal abrasion of the slide member can be prevented. In addition, the sliding loss of the slide member can be reduced. Therefore, the refrigerant compressor can improve reliability and realize high efficiency. Furthermore, by use of the refrigerant which produces less greenhouse effect, global warming can be suppressed.

In the refrigerant compressor having the above-described configuration, the electric component may be inverter-driven at one of a plurality of operation frequencies.

In this configuration, even during a low-speed operation (running) in which the oil is not sufficiently fed to the slide sections, the oxide coating film with a high abrasion resistance can improve reliability of the refrigerant compressor. Also, during a high-speed operation (running) in which the rotational speed of the electric component increases, the oxide coating film with a high abrasion resistance can maintain high reliability. As a result, reliability of the refrigerant compressor can be further improved.

A refrigeration device according to the present disclosure comprises a refrigerant circuit including the refrigerant compressor having the above-described configuration, a heat radiator, a pressure reducing unit, and a heat absorber, which are annularly coupled to each other via a pipe.

In this configuration, the refrigeration device includes the refrigerant compressor with higher efficiency. This makes it possible to reduce electric power consumption of the refrigeration device, and achieve energy saving.

Now, typical embodiments of the present disclosure will be described with reference to the drawings. Throughout the drawings, the same or corresponding components (members) are designated by the same reference symbols, and will not be described in repetition.

Embodiment 1

[Configuration of Refrigerant Compressor]

Figure 2A:
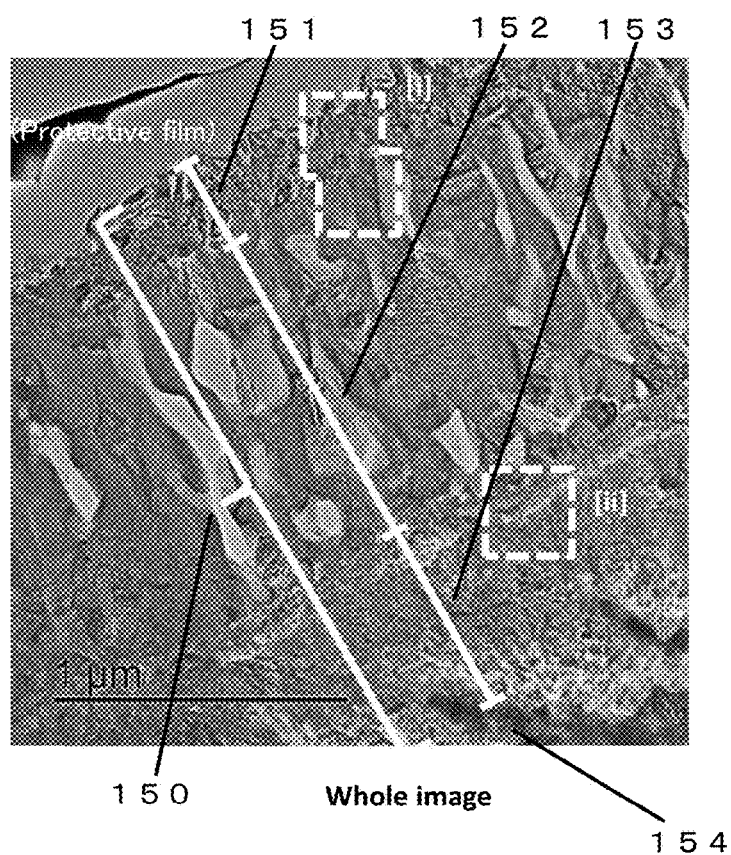
FIGS. 2A to 2C are TEM (transmission electron microscope) images showing an example of a result of TEM observation performed for an oxide coating film provided on the slide section of the refrigerant compressor according to Embodiment 1.

Firstly, a typical example of the refrigerant compressor according to Embodiment 1 will be specifically described with reference to FIGS. 1 and 2A. FIG. 1 is a cross-sectional view of a refrigerant compressor 100 according to Embodiment 1. FIG. 2A is a microscope photograph showing an example of a result of TEM observation performed for a slide section of the refrigerant compressor 100.

As shown in FIG. 1, in the refrigerant compressor 100, a refrigerant gas 102 comprising R134a is filled inside a sealed container 101, and ester oil as lubricating oil 103 is reserved in the bottom portion of the sealed container 101. Inside the sealed container 101, an electric component 106 including a stator 104 and a rotor 105, and a reciprocating compression component 107 configured to be driven by the electric component 106 are accommodated.

The configuration of the compression component 107 includes a crankshaft 108, a cylinder block 112, a piston 132, and the like. The configuration of the compression component 107 will be described below.

The crankshaft 108 includes at least a main shaft section 109 to which the rotor 105 is pressingly secured, and an eccentric shaft 110 which is provided eccentrically with the main shaft section 109. An oil feeding pump 111 is provided at the lower end of the crankshaft 108 and is in communication with the lubricating oil 103.

The crankshaft 108 comprises a base material 154 made of gray cast iron (FC cast iron) containing about 2% silicon (Si), and an oxide coating film 150 provided on a surface of the base material 154. FIG. 2A shows a typical example of the oxide coating film 150 according to Embodiment 1. FIG. 2A shows an example of a result of TEM (transmission electron microscopy) observation performed for the cross-section of the oxide coating film 150 and shows the image of whole of the oxide coating film 150 in a thickness direction.

As shown in FIG. 2A, the oxide coating film 150 according to Embodiment 1 includes a first portion 151 containing fine crystals 155, a second portion 152 located under the first portion 151 and containing columnar grains 156 which are vertically elongated, and a third portion 153 located under the second portion 152 and containing layered grains 157 which are horizontally elongated, the first portion 151, the second portion 152, and the third portion 153 being arranged in this order from the outermost surface of the oxide coating film 150. Under the third portion 153, the base material 154 is located.

The oxide coating film 150 according to Embodiment 1 has a thickness of about 3 μm. The oxide coating film 150 of FIG. 2A is formed on a disc (base material 154) used in a ring on disc abrasion test in Example 1 which will be described later.

The cylinder block 112 comprises cast iron. The cylinder block 112 is formed with a bore 113 with a substantially cylindrical shape, and includes a bearing section 114 supporting the main shaft section 109.

The rotor 105 is provided with a flange surface 120. The upper end surface of the bearing section 114 is a thrust surface 122. A thrust washer 124 is disposed between the flange surface 120 and the thrust surface 122 of the bearing section 114. The flange surface 120, the thrust surface 122, and the thrust washer 124 constitute a thrust bearing 126.

The piston 132 is loosely fitted into the bore 113 with a clearance. The piston 132 comprises an iron-based material. The piston 132 forms a compression chamber 134 together with the bore 113. The piston 132 is coupled to the eccentric shaft 110 via a connecting rod 138 as a coupling means by use of a piston pin 137. The end surface of the bore 113 is closed by a valve plate 139.

A head 140 constitutes a high-pressure chamber. The head 140 is secured to the valve plate 139 on a side opposite to the bore 113. A suction tube (not shown) is secured to the sealed container 101 and connected to a low-pressure side (not shown) of a refrigeration cycle. The suction tube leads the refrigerant gas 102 to the inside of the sealed container 101. A suction muffler 142 is retained between the valve plate 139 and the head 140.

The operation of the refrigerant compressor 100 configured as described above will be described below.

Electric power supplied from a power supply utility (not shown) is supplied to the electric component 106, and rotates the rotor 105 of the electric component 106. The rotor 105 rotates the crankshaft 108. An eccentric motion of the eccentric shaft 110 is transmitted to the piston 132 via the connecting rod 138 as the coupling means and the piston pin 137, and drives the piston 132. The piston 132 reciprocates inside the bore 113. The refrigerant gas 102 led to the inside of the sealed container 101 through the suction tube (not shown) is suctioned from the suction muffler 142, and is compressed inside the compression chamber 134.

According to the rotation of the crankshaft 108, the lubricating oil 103 is fed to slide sections by the oil feeding pump 111. The lubricating oil 103 lubricates the slide sections and seals the clearance between the piston 132 and the bore 113. The slide sections are defined as sections (portions) which slide in a state in which a plurality of slide members are in contact with each other in their slide surfaces.

In recent years, to provide higher efficiency of the refrigerant compressor 100, for example, (1) lubricating oil with a lower viscosity is used as the lubricating oil 103 as described above, or (2) the slide length of the slide members (a distance for which the slide members slide) constituting the slide sections is designed to be shorter. For this reason, slide conditions are getting more harsh. Specifically, there is a tendency that the oil film formed between the slide sections is thinner, or difficult to form.

In addition to the above, in the refrigerant compressor 100, the eccentric shaft 110 of the crankshaft 108 is provided eccentrically with the bearing section 114 of the cylinder block 112, and the main shaft section 109 of the crankshaft 108. In this layout, a fluctuating (variable) load which causes a load fluctuation (change) is applied to regions between the main shaft section 109 of the crankshaft 108, the eccentric shaft 110 and the connecting rod 138, due to a gas pressure of the compressed refrigerant gas 102. With the load fluctuation (change), the refrigerant gas 102 dissolved into the lubricating oil 103 is evaporated into bubbles in repetition, in, for example, the region between the main shaft section 109 and the bearing section 114. In this way, the bubbles are generated in the lubricating oil 103.

For the above-described reasons, for example, in the slide sections of the main shaft section 109 of the crankshaft 108 and the bearing section 114, the oil film has run out, and the metals of the slide surfaces contact each other more frequently.

However, the slide section of the refrigerant compressor 100, for example, the slide section of the crankshaft 108 as an example of Embodiment 1 comprises the oxide coating film 150 having the above-described configuration. For this reason, even if the oil film has run out more frequently, the abrasion of the slide surface caused by this can be suppressed over a long period of time.

[Configuration of Oxide Coating Film]

Next, the oxide coating film 150 which can suppress the abrasion of the slide section will be described in more detail with reference to FIGS. 2B to 4 as well as FIG. 2A.

Figure 2B:
Figure 2C:
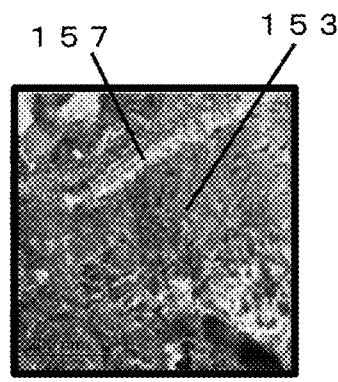

As described above, FIG. 2A shows the TEM image showing the image of the whole of the oxide coating film 150 in the thickness direction. FIG. 2B shows the TEM image displaying in an enlarged manner "i" portion surrounded by a broken line of FIG. 2A. FIG. 2C shows the TEM image displaying in an enlarged manner "ii" portion surrounded by a broken line of FIG. 2A.

Figure 3A:
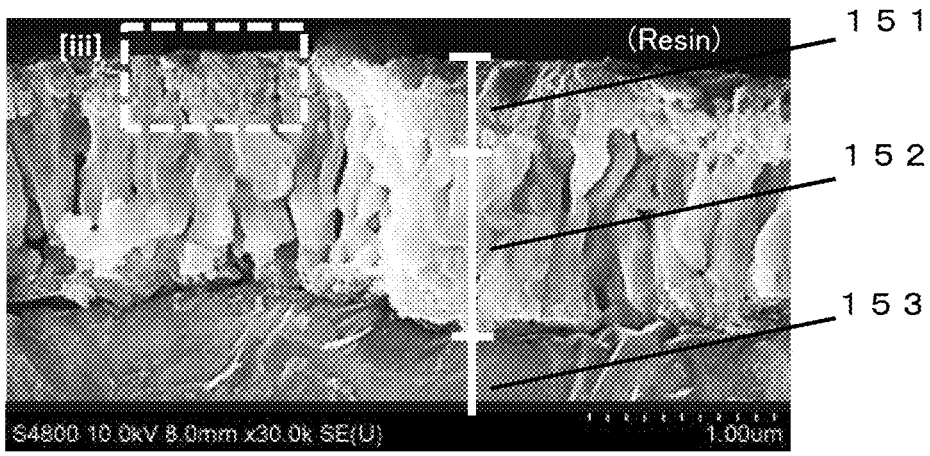
FIGS. 3A and 3B are SEM (scanning electron microscope) images showing an example of a result of SEM observation performed for the oxide coating film according to Embodiment 1.
Figure 3B:
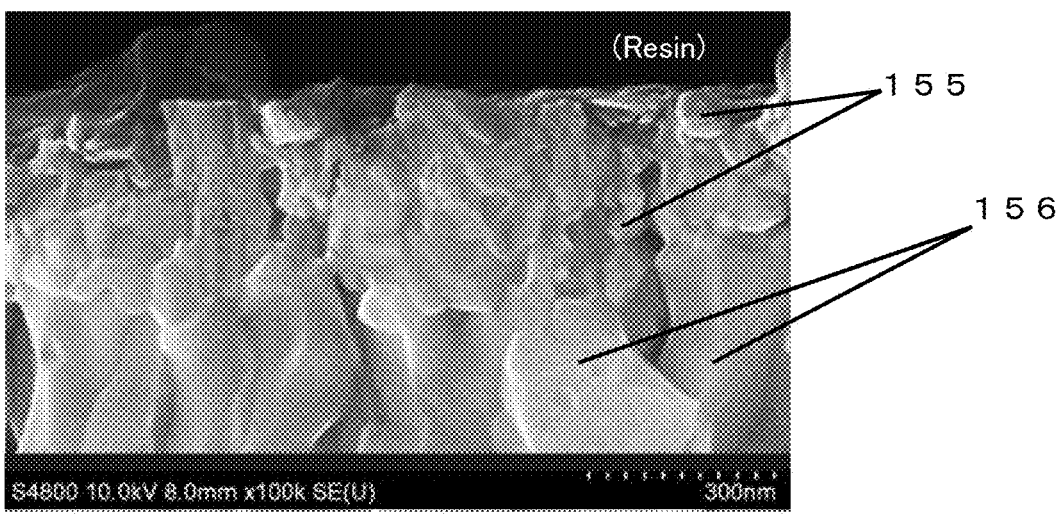
Figure 4:
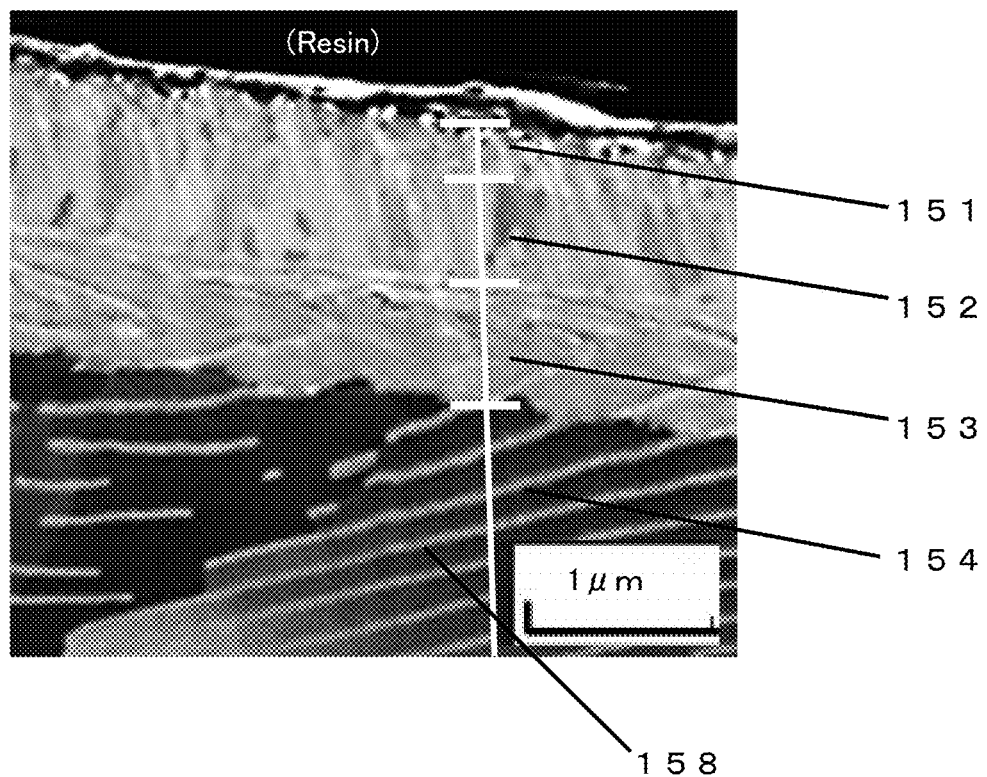
FIG. 4 is a SIM (scanning ion microscope) image showing an example of a result of SIM observation performed for the oxide coating film according to Embodiment 1.

FIG. 3A is the SEM (scanning electron microscope) image showing an example of a result of SEM observation performed for the first portion 151 and the second portion 152, in the oxide coating film 150 according to Embodiment 1. FIG. 3B shows the SEM image displaying in an enlarged manner "iii" portion of FIG. 3A. FIG. 4 is a SIM (scanning ion microscope) image showing an example of a result of SIM observation performed for the oxide coating film 150 according to Embodiment 1.

In Embodiment 1, the crankshaft 108 comprises the base material 154 made of gray cast iron (FC cast iron). The oxide coating film 150 is formed on the surface of the base material 154. Specifically, for example, the slide surface of the base material 154 is subjected to polish finish, and then the oxide coating film 150 is formed by oxidation by use of an oxidation gas.

In the example of FIG. 2A, the upper side corresponds to the outermost surface, and the lower side corresponds to the base material 154 (in the example of FIG. 2A, the thickness direction of the oxide coating film 150 is actually inclined to the left, but is expressed as a substantially vertical direction for the sake of convenience). Therefore, in the example of FIG. 2A, substantially upward and downward direction will be expressed as "vertical direction", and a direction perpendicular to the vertical direction will be expressed as "horizontal direction."

As described above, as shown in FIG. 2A, the oxide coating film 150 according to Embodiment 1 includes at least the first portion 151 containing the fine crystals 155, the second portion 152 located under the first portion 151 and containing the columnar grains 156 which are vertically elongated, and the third portion 153 located under the second portion 152 and containing the layered grains 157 which are horizontally elongated, the first portion 151, the second portion 152, and the third portion 153 being arranged in this order from the outermost surface of the oxide coating film 150. Under the third portion 153, the base material 154 is located.

Note that in the TEM observation of the sample (a portion of the crankshaft 108) provided with the oxide coating film 150, a protective film (carbon vapor-deposited film) is formed on the oxide coating film 150 to protect the sample. In the example of FIG. 2A, a portion above the first portion 151 is the protective film.

As shown in FIGS. 2A to 2C and FIGS. 3A and 3B, in the oxide coating film 150 according to Embodiment 1, the first portion 151 formed in the outermost surface contains the grains of the fine crystals 155 with a grain (particle) diameter of 100 nm or less which are densely arranged. In the SEM observation of the sample (a portion of the crankshaft 408) provided with the oxide coating film 150, the protective resin film is formed on the oxide coating film 150 to protect the sample. Therefore, the surface of the oxide coating film 150 is embedded in the resin. In the example of FIGS. 3A and 3B, this resin is provided above the first portion 151.

As shown in FIGS. 3A and 3B, the second portion 152 is located under the first portion 151. The second portion 152 contains grains with a vertical diameter of about 500 nm to 1 µm and a horizontal diameter of about 100 nm to 150 nm. An aspect ratio obtained by dividing the vertical diameter of the grain by the horizontal diameter of the grain is in a range of about 3 to 10. Therefore, the grains are vertically elongated. From this, it can be seen that the second portion 152 contains a number of (numerous) vertically elongated columnar grains 156 arranged in the same direction and having a high aspect ratio.

As shown in FIGS. 2A to 2C, FIGS. 3A and 3B, and FIG. 4, in the oxide coating film 150 according to Embodiment 1, the third portion 153 is located under the second portion 152. The third portion 153 contains the grains with a vertical diameter of several tens nm or less and a horizontal diameter of about several hundreds nm. An aspect ratio obtained by dividing the vertical diameter of the grain by the horizontal diameter of the grain is in a range of 0.01 to 0.1. Therefore, the grains are horizontally elongated. From this, it can be seen that the third portion 153 contains the horizontally elongated layered grains 157 with a low aspect ratio. In the example of FIG. 4, the above-described protective resin film is provided above the first portion 151.

As shown in FIG. 4, the third portion 153 contains cementite 158 as the grains of the base material 154. In contrast, the first portion 151 and the second portion 152 do not contain the cementite 158. From this, it is estimated that the third portion 153 is formed by diffusion of oxygen to the base material 154, by oxidation of the base material 154. It is also estimated that the first portion 151 and the second portion 152 are formed by the oxide grown on the surface of the base material 154.

As a manufacturing method (formation method) of the oxide coating film 150, a known oxidation method of the iron-based material may be suitably used and is not particularly limited. Manufacturing conditions or the like can be suitably set, depending on the conditions which are the kind of the iron-based material which is the base material 154, its surface state (the above-described polishing finish, etc.), desired physical property of the oxide coating film 150, and the like. In the present disclosure, the oxide coating film 150 can be formed on the surface of the base material 154 by oxidating gray cast iron as the base material 154 within a range of several hundreds degrees C., for example, within a range of 400 to 800 degrees C., by use of a known oxidation gas such as a carbon dioxide gas and known oxidation equipment.

It is sufficient that the oxide coating film 150 according to Embodiment 1 includes the first portion 151, and at least one of the second portion 152 and the third portion 153. In other words, by adjusting the conditions, the oxide coating film 150 may include two layers which are the first portion 151 and the second portion 152 or two layers which are the first portion 151 and the third portion 153. Further, by adjusting the conditions, the oxide coating film 150 may include three layers which are the first portion 151, the second portion 152, and the third portion 153 as described above.

As a typical configuration of the oxide coating film 150, as shown in FIGS. 2A to 4, a three-layer structure composing the first portion 151, the second portion 152 and the third portion 153 are arranged in this order from the outermost surface. However, the oxide coating film 150 may include other portions, and the stacking order of these portions may be suitably set, by adjusting the conditions. This is obvious from Comparative Example 1 or Comparative Example 2 which will be described later the fact that the oxide coating film consisting of (including only) the second portion 152, or the oxide coating film including the second portion 152, and the third portion 153 can be formed by setting the conditions.

As will be described in Embodiment 2 later, the first portion 151 may be as follows. The oxide coating film 150 according to Embodiment 1 includes the first portion 151 as an essential portion, and may include the second portion 152, or the third portion 153. The oxide coating film 150 according to Embodiment 1 may include all of the first portion 151, the second portion 152, and the third portion 153. Further, the oxide coating film 150 according to Embodiment 1 may include other portions (portions other than the first portion 151, the second portion 152, and the third portion 153).

The first portion 151 contains the grains of the fine crystals 155. This does not mean that the first portion 151 does not contain grains or the like which are other than the fine crystals 155. In the present disclosure, the first portion 151 substantially contains the fine crystals 155, and may contain other grains or the like which are impurities. Therefore, the first portion 151 may contain at least the fine crystals 155. That is, the first portion 151 may contain other grains (see Embodiment 2 which will be described later) so long as the first portion 151 contains the fine crystals 155 as major grains.

The second portion 152 may contain other grains or substantially contain the columnar grains 156 so long as the second portion 152 contains the columnar grains 156. The third portion 153 may contain other grains or may substantially contain the layered grains 157 so long as the third portion 153 contains the layered grains 157. The first portion 151, the second portion 152, and the third portion 153 may contain grains other than the essential grains so long as the first portion 151, the second portion 152, and the third portion 153 can provide the advantages obtained in Examples which will be described later.

The upper limit of the crystal grain size (grain diameter) of the fine crystals 155 is not limited to 100 nm or less in the oxide coating film 150 according to Embodiment 1 so long as the first portion 151 contains the fine crystals 155 with a nano level which are densely arranged. For example, the crystal grain size (grain diameter) of the fine crystals 155 may be in a range of 0.001 μm (1 nm)~1 μm (1000 nm). This makes it possible to obtain the advantages similar to those obtained in Examples 1 to 3 which will be described later.

The aspect ratio of the columnar grains 156 is not limited to a value in a range of 3 to 10, in the oxide coating film 150 according to Embodiment 1, so long as the second portion 152 contains a number of (numerous) vertically elongated columnar grains 156 arranged in the same direction and having a high aspect ratio. For example, the aspect ratio of the columnar grains 156 may be in a range of 1 to 20. This makes it possible to obtain the advantages similar to those obtained in Examples 1 to 3 which will be described later.

The aspect ratio of the layered grains 157 is not limited to a value in a range of 0.01 to 0.1, in the oxide coating film 150 according to Embodiment 1, so long as the third portion 153 contains the layered grains 157 which are horizontally elongated and have a low aspect ratio. For example, the aspect ratio of the layered grains 157 may be in a range of 0.01 to 1. This makes it possible to obtain the advantages similar to those obtained in Examples 1 to 3 which will be described later.

Note that each of the grain (particle) diameter of the fine crystals 155 of the first portion 151, the aspect ratio of the columnar grains 156 of the second portion 152, and the aspect ratio of the layered grains 157 of the third portion 153 can be set to a value in a suitable range, by suitably setting manufacturing conditions of the oxide coating film 150 depending on the base material conditions such as the kind or surface state of the base material 154.

[Evaluation of Oxide Coating Film]

Next, results of evaluation of characteristic of a typical example of the oxide coating film 150 according to Embodiment 1 will be described with reference to FIGS. 5 to 7. How the grains of the first portion 151, the second portion 152, and the third portion 153 contribute to the characteristic of the oxide coating film 150 will be described below, with reference to the results of Example, Prior Art Example, and Comparative Example.

Example 1

As the slide member, a disc made of gray cast iron was used. The base material 154 was gray cast iron. The surface of the disc was the slide surface. As described above, the disc was oxidated within a range of 400 to 800 degrees C., by use of the oxidation gas such as the carbon dioxide gas, to form the oxide coating film 150 according to Embodiment 1 on the slide surface. As shown in FIGS. 2A to 4, the oxide coating film 150 included the first portion 151, the second portion 152, and the third portion 153. In this way, evaluation sample of Example 1 was prepared. The abrasion resistance of the evaluation sample and attacking characteristic of the evaluation sample with respect to the other member (sliding between the evaluation sample and the other member occurred) were evaluated as will be described later.

Prior Art Example 1

As a surface treatment film, the conventional phosphate coating film was formed instead of the oxide coating film 150 according to Embodiment 1. Except this, the evaluation sample of Prior Art Example 1 was prepared as in Example 1. The abrasion resistance of the evaluation sample and attacking characteristic of the evaluation sample with respect to the other member (sliding between the evaluation sample and the other member occurred) were evaluated as will be described later.

Comparative Example 1

As a surface treatment film, a comparative oxide coating film including a single layer of a portion (third portion 153) containing the layered grains 157 was formed, instead of the oxide coating film 150 according to Embodiment 1. Except this, the evaluation sample of Comparative Example 1 was prepared as in Example 1. The abrasion resistance of the evaluation sample and attacking characteristic of the evaluation sample with respect to the other member (sliding between the evaluation sample and the other member occurred) were evaluated as will be described later.

Comparative Example 2

As a surface treatment film, a comparative oxide coating film including two layers in which a portion (second portion 152) containing the columnar grains 156 was formed above a portion (third portion 153) containing the layered grains 157 was formed, instead of the oxide coating film 150 according to Embodiment 1. Except this, the evaluation sample of Comparative Example 2 was prepared as in Example 1. The abrasion resistance of the evaluation sample and attacking characteristic of the evaluation sample with respect to the other member (sliding between the evaluation sample and the other member occurred) were evaluated as will be described later.

Evaluation of Abrasion Resistance and Attacking Characteristic with Respect to the Other Member The ring on disc abrasion test was conducted on the above-described evaluation samples in a mixture ambience including R134a refrigerant and ester oil with VG3 (viscosity grade at 40 degrees C. was 3 mm²/s). In addition to discs as the evaluation samples, rings each including a base material made of gray cast iron and having a surface (slide surface) having been subjected to only the surface polishing, were prepared as the other members (sliding between the evaluation sample and the other member occurred). The abrasion test was conducted under a condition of a load 1000N, by use of intermediate (medium) pressure CFC friction/abrasion test machine AFT-18-200M (product name) manufactured by A&D Company, Limited. In this way, the abrasion resistance of the surface treatment film formed on the evaluation sample (disc) and the attacking characteristic of the surface treatment film with respect to the slide surface of the other member (ring) were evaluated.

Comparison Among Example 1, Prior Art Example 1, Comparative Examples

FIG. 5 shows a result of the ring on disc abrasion test and shows the abrasion amounts of the discs as the evaluation samples. FIG. 6 shows a result of the ring on disc abrasion test and shows the abrasion amounts of the rings as the other members.

As shown in FIG. 5, the abrasion amounts were less in the surface treatment films (oxide coating films) of Example 1, Comparative Example 1, and Comparative Example 2 than in the surface treatment film (phosphate coating film) of Prior Art Example 1. From this, it was found out that the surface treatment films of Example 1, Comparative Example 1, and Comparative Example 2 had high abrasion resistances. In particular, almost no abrasion was observed in the surface of the disc provided with the oxide coating film 150 of Example 1 and the surface of the disc provided with the comparative oxide coating film of Comparative Example 2. From this, it was found out that the abrasion resistances of the oxide coating films were higher than that of the phosphate coating film.

In contrast, as shown in FIG. 6, regarding the abrasion amounts of the rings which were the other members, almost no abrasion was observed in Example 1, Comparative Example 1, and Prior Art Example 1. However, a significant abrasion was observed in Comparative Example 2. From this, it was found out that the comparative oxide coating film of Comparative Example 2 had high attacking characteristic with respect to the other member.

As should be understood from the above, the abrasions of the disc and the ring, corresponding to only Example 1, namely, only the slide member including the oxide coating film 150, were not substantially observed. Thus, it was found out that the slide member including the oxide coating film 150 could realize high abrasion resistance and effectively suppress attacking characteristic with respect to the other member.

From the results of Example 1, Prior Art Example 1, Comparative Examples, the oxide coating film 150 according to Embodiment 1 can obtain the following advantages.

It is estimated that slippage occurs in the grains while the slide member is sliding, in the configuration of Comparative Example 1 in which the surface treatment film comprises substantially only the third portion 153, namely, the surface treatment film comprises only the portion containing the layered grains 157 which are the single layer and parallel to the slide direction. For this reason, some abrasion occurs in the slide surface of the slide member (disc) having the surface treatment film, whereas almost no abrasion occurs in the slide surface of the other member (ring). Therefore, the abrasion resistance of the slide member (disc) of Comparative Example 1 is low and not so low as that of Prior Art Example 1, but the attacking characteristic of the slide member (disc) of Comparative Example 1 with respect to the other member is suppressed.

In the configuration of Comparative Example 2 in which the surface treatment film includes the two layers which are the second portion 152 and the third portion 153 provided in this order, from the outermost surface, namely, the configuration in which the portion containing the columnar grains 156 is provided on the portion containing the layered grains 157, numerous columnar grains 156 with a bundle form are present on the slide surface. It is estimated that such a configuration can increase the mechanical strength of the slide surface of the disc and hence the abrasion resistance of the slide member (disc). However, it is considered that the slide surface of the slide member (disc) attacks the slide surface of the other member (ring) which is not provided with the oxide coating film and as a result, the slide surface of the other member is abraded, for some time after sliding starts, i.e., during initial abrasion period.

After the ring on disc abrasion test was conducted, the slide surface of the slide member (disc) was observed. Peeling in a region that is in the vicinity of the interface between the columnar grains 156 and the layered grains 157 was not observed. From this, it is estimated that the second portion 152 containing the columnar grains 156 and the third portion 153 containing the layered grains 157 have high adhesion strength at the interface, and the peeling resistance of the surface treatment film of Comparative Example 2 is high.

In Example 1, the surface treatment film is the oxide coating film 150 including the first portion 151, the second portion 152, and the third portion 153. The slide member (disc) of Example 1 has abrasion resistance higher than those of the slide member (disc) of Comparative Example 1 and the slide member (disc) of Comparative Example 2. In addition, the slide member of Example 1 can effectively suppress the attacking characteristic with respect to the other member, because almost no abrasion occurs in the slide surface of the other member (ring).

As described above, in Example 1, the oxide coating film 150 according to Embodiment 1 can realize high abrasion resistance and very low attacking characteristic with respect to the other member. It is estimated that the oxide coating film 150 can realize this because of the presence of the first portion 151. The first portion 151 contains the fine crystals 155 with a grain (particle) diameter of 100 nm or less. Between the fine crystals 155, there are minute voids, or minute concave-convex portions provided on the surface. Because of the minute voids and/or the minute concave-convex portions, the slide surface can retain the lubricating oil 103, and have the oil retaining capability, even in a situation in which the slide member slides under harsh conditions. As a result, the oil film is easily formed on the slide surface.

The oxide coating film 150 contains the columnar grains 156 and the layered grains 157, in a region which is closer to the base material 154. The columnar grains 156 and the layered grains 157 have hardness lower than that of the fine crystals 155 (these grains are softer than the fine crystals 155). It is estimated that the columnar grains 156 and the layered grains 157 serve as "buffering material" during the sliding. It is considered that the fine crystals 155 are compressed toward the base material 154 due to a pressure applied to the surface during sliding. It is considered that the attacking characteristic of the oxide coating film 150 with respect to the other member is more suppressed than the other surface treatment films, and the abrasion of the slide surface of the other member is effectively suppressed.

From the above-described respects, it is essential that the oxide coating film 150 according to Embodiment 1 comprises at least the first portion 151, and the oxide coating film 150 may comprise either the second portion 152 or the third portion 153. More preferably, as can be clearly seen from the results of Comparative Example 1 and Comparative Example 2, the oxide coating film 150 may comprise all of the first portion 151, the second portion 152, and the third portion 153.

Although the ring on disc abrasion test of Embodiment 1 was conducted in a state in which the disc was provided with the oxide coating film, similar results are obtained in a case where the ring is provided with the oxide coating film. Further, evaluation method of the abrasion resistance of the oxide coating film is not limited to the ring on disc abrasion test, and may be other test methods.

Example 2

As the evaluation sample, a round rod made of gray cast iron was used. The base material 154 was the gray cast iron, and the surface of the round rod made of gray cast iron was the slide surface. As in Example 1, the oxide coating film 150 according to Embodiment 1 was formed on the surface of the round rod made of gray cast iron. As shown in FIGS. 2A to 4, the oxide coating film 150 comprised the first portion 151, the second portion 152, and the third portion 153. In this way, the evaluation sample of Example 2 was formed. The first end portion of this evaluation sample was immersed in the lubricating oil 103. It was observed that the lubricating oil 103 significantly moved upward from the first end of the evaluation sample toward the second end of the evaluation sample.

The first portion 151 comprised the grains of the fine crystals 155 with a grain (particle) diameter of 100 nm or less which were densely arranged. It was experimentally supported that the lubricating oil 103 was easily retained in the surface (slide surface) of the oxide coating film 150 by a capillary action. From the result of Example 2, it was found out that the oxide coating film 150 according to Embodiment 1 could have sufficient oil retaining capability, and hence the slide member including the oxide coating film 150 had high abrasion resistance and suppressed attacking characteristic with respect to the other member.

Example 3

Next, a device reliability test was conducted on the refrigerant compressor 100 including the crankshaft 108 provided with the oxide coating film 150 according to Embodiment 1. The refrigerant compressor 100 has the configuration of FIG. 1 as described above, which will not be described in repetition. In the device reliability test, as in the above-described Example 1, or the like, R134a refrigerant and ester oil with VG3 (viscosity grade at 40 degrees C. was 3 mm²/s) were used. To accelerate the abrasion of the main shaft section 109 of the crankshaft 108, the refrigerant compressor 100 was operated in a high-temperature high-load intermittent operation mode in which operation (running) and stopping of the refrigerant compressor 100 were repeated within a short time under a high-temperature state.

After the device reliability test was finished, the refrigerant compressor 100 was disassembled, the crankshaft 108 was taken out, and the slide surface of the crankshaft 108 was checked. Based on a result of the observation of the slide surface, evaluation of the device reliability test was conducted.

Prior Art Example 2

The device reliability test was conducted on the refrigerant compressor 100 including the crankshaft 108 as in Example 3, except that the crankshaft 108 was provided with the conventional phosphate coating film. After the device reliability test was finished, the refrigerant compressor 100 was disassembled, the crankshaft 108 was taken out, and the slide surface of the crankshaft 108 was checked.

Comparison Between Example 3 and Prior Art Example 2

In Prior Art Example 2, the abrasion occurred in the slide surface of the crankshaft 108, and damage to the phosphate coating film was observed. In contrast, in Example 3, damage to the slide surface of the crankshaft 108 was very slight.

Further, the cross-section of the slide surface of the crankshaft 108 of Example 3 was observed by TEM. FIG. 7 shows the result. FIG. 7 shows the TEM image of the cross-section of the slide surface. In the example of FIG. 7, the protective resin film is provided above the first portion 151 to protect the sample, as described with reference to FIG. 2A.

Figure 7:
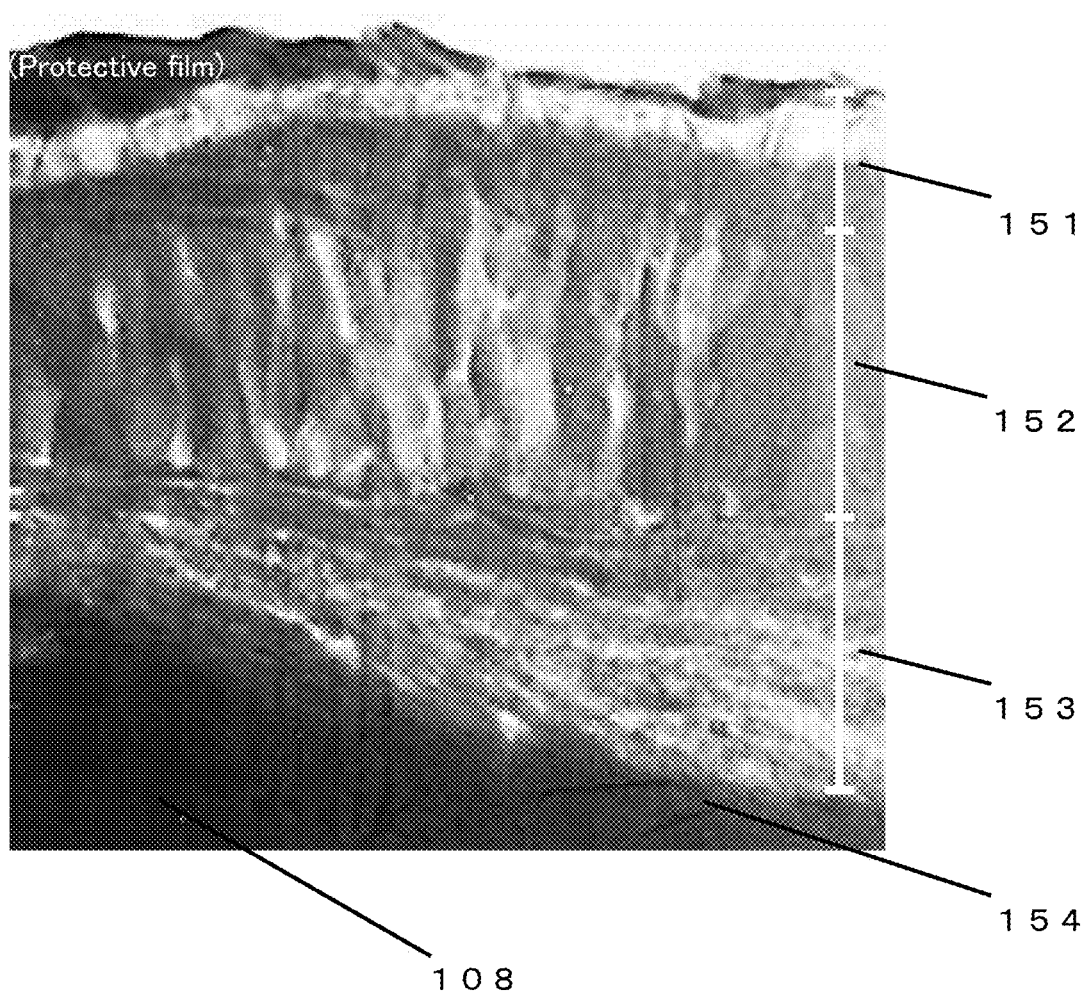
FIG. 7 is a TEM (transmission electron microscope) image showing an example of a result of TEM observation performed for the slide member including the oxide coating film according to Embodiment 1, after a device reliability test is conducted.

As shown in FIG. 7, even though the refrigerant compressor 100 was operated under the harsh condition, the first portion 151 containing the fine crystals 155 remained in the slide surface of the crankshaft 108. From this, it was considered that the first portion 151 included in the oxide coating film 150 according to Embodiment 1 was a stationary (steady) abrasion region (region in which the slide surface had a conformability state, region in which the abrasion progressed very slowly). From this, it was found out that the slide member (the crankshaft 108 in Example 3) including the oxide coating film 150 had a very high abrasion resistance under an environment in which the refrigerant was compressed.

[Modification, Etc.]

As described above, in Embodiment 1, at least one of the slide members of the refrigerant compressor 100 is made of the iron-based material, and the oxide coating film 150 including the first portion 151 containing the fine crystals 155, the second portion 152 containing the columnar grains 156, and the third portion 153 containing the layered grains 157 is formed on the slide surface of this iron-based material.

With this structure, the abrasion resistance of the slide member can be increased, and the attacking characteristic with respect to the other member can be effectively suppressed. This makes it possible to realize high efficiency design of the refrigerant compressor 400 (design in which the viscosity of the lubricating oil 103 is reduced, and the slide length of slide sections (a distance for which the slide sections slide) is designed to be shorter), which was difficult to realize in the case of the conventional surface treatment film. As a result, in the refrigerant compressor 100, a sliding loss of the slide section can be reduced, and high reliability and high efficiency can be achieved.

Although the thickness of the oxide coating film 150 is about 3 μm in Embodiment 1, the thickness of the oxide coating film 150 is not limited to this. Typically, the thickness of the oxide coating film 150 may be in a range of 1 to 5 μm. In a case where the thickness of the oxide coating film 150 is less than 1 μm, it is difficult for the oxide coating film 150 to maintain the characteristics such as the abrasion resistance over a long period of time, depending on the conditions. On the other hand, in a case where the thickness of the oxide coating film 170 is more than 5 μm, surface roughness of the slide surface becomes excess depending on the conditions. Therefore, in some cases, it is difficult to control accuracy of the slide sections constituted by the plurality of slide members.

Although gray cast iron is used as the base material 154 in Embodiment 1, the material of the base material 154 is not limited to this. The specific structure of the base material 154 provided with the oxide coating film 150 is not particularly limited so long as it is the iron-based material. Typically, cast iron is suitably used as the base material 154, and the iron-based material is not limited to the cast iron. The base material 154 may be a steel material, a sintered material, or other iron-based materials. Also, the specific kind of the cast iron is not particularly limited, and may be gray cast iron (cast iron, FC cast iron) as described above, spherical graphite cast iron (FCD cast iron), or other cast irons.

Commonly, gray cast iron contains about 2% silicon. The content of silicon of the base material 154 is not particularly limited. In a case where the iron-based material contains silicon, the adhesivity of the oxide coating film 150 can be improved in some cases. In general, the cast iron contains about 1 to 3% silicon. Therefore, for example, spherical graphite cast iron (FCD cast iron) can be used as the base material 154. Commonly, the steel material or the sintered material does not substantially contain silicon, or the content of silicon of the steel material or the sintered material is lower than that of the cast iron. About 0.5 to 10% silicon may be added to the steel material or the sintered material. This makes it possible to obtain advantages similar to those in a case where the cast iron is used as the base material 154.

The state of the surface of the base material 154 on which the oxide coating film 150 is formed, namely, the slide surface, is not particularly limited. Typically, the surface of the base material 154 is the polished surface as described above. However, the surface of the base material 154 may be an unpolished surface or a surface having been subjected to a known surface treatment before the oxidation, depending on the kind of the base material 154, the kind of the slide member, or the like.

Although in Embodiment 1, R134a is used as the refrigerant, the kind of the refrigerant is not limited to this. Although in Embodiment 1, the ester oil is used as the lubricating oil 103, the kind of the lubricating oil 103 is not limited to this. Known refrigerant and lubricating oil may be suitably used as combinations of the refrigerant and the lubricating oil 103.

Suitable combinations of the refrigerant and the lubricating oil 103 are, for example, three examples described below. By using these combinations, high efficiency and reliability of the refrigerant compressor 100 can be achieved as in Embodiment 1.

In an example of combination 1, R134a, another HFC-based refrigerant, or HFC-based mixed refrigerant is used as the refrigerant, and ester oil, alkylbenzene oil, polyvinyl ether, polyalkylene glycol, or mixed oil including any of ester oil, alkylbenzene oil, polyvinyl ether, and polyalkylene glycol may be used as the lubricating oil 103.

In an example of combination 2, natural refrigerant such as R600a, R290, or R744, or mixed refrigerant including any of the natural refrigerants is used as the refrigerant, and one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol may be used as the lubricating oil 103.

In an example of combination 3, HFO-based refrigerant such as R1234yf or mixed refrigerant of HFO-based refrigerants is used as the refrigerant, and one of ester oil, alkylbenzene oil, polyvinyl ether, and polyalkylene glycol, or mixed oil including any of ester oil, alkylbenzene oil, polyvinyl ether, and polyalkylene glycol may be used as the lubricating oil 103.

Among the above-described combinations, the combination 2 or 3 can suppress global warming by use of the refrigerant which produces less greenhouse effect. In the combination 3, a group of the lubricating oil 103 may further include mineral oil.

Although in Embodiment 1, the refrigerant compressor 100 is the reciprocating refrigerant compressor as described above, the refrigerant compressor of the present disclosure is not limited to the reciprocating refrigerant compressor, and is applicable to other compressors, such as a rotary refrigerant compressor, a scroll refrigerant compressor, or a vibrational refrigerant compressor. The refrigerant compressor to which the present disclosure is applicable can obtain advantages similar to those of Embodiment 1 so long as it has a known configuration including the slide sections, discharge valves, others.

Although in Embodiment 1, the refrigerant compressor 100 is driven by the power supply utility, the refrigerant compressor according to the present disclosure is not limited to this, and may be inverter-driven at any one of a plurality of operating frequencies. By forming the oxide coating film 150 having the above-described configuration on the slide surface of the slide section included in the refrigerant compressor which is inverter-driven at any one of a plurality of operating frequencies, the abrasion resistance of the slide section can be improved and the attacking characteristic with respect to the other member can be suppressed. This makes it possible to improve reliability of the refrigerant compressor even during a low-speed operation (running) in which the oil is not sufficiently fed to the slide sections, or during a high-speed operation (running) in which the rotational speed of the electric component increases.

Embodiment 2

In Embodiment 1, a preferable example of the oxide coating film 150 includes the first portion 151, the second portion 152, and the third portion 153. The present disclosure is not limited to this. In Embodiment 2, a configuration in which the first portion 151 includes a first a portion and a first b portion which are different from each other in crystal density will be specifically described.

[Configuration of Refrigerant Compressor]

Figure 8:
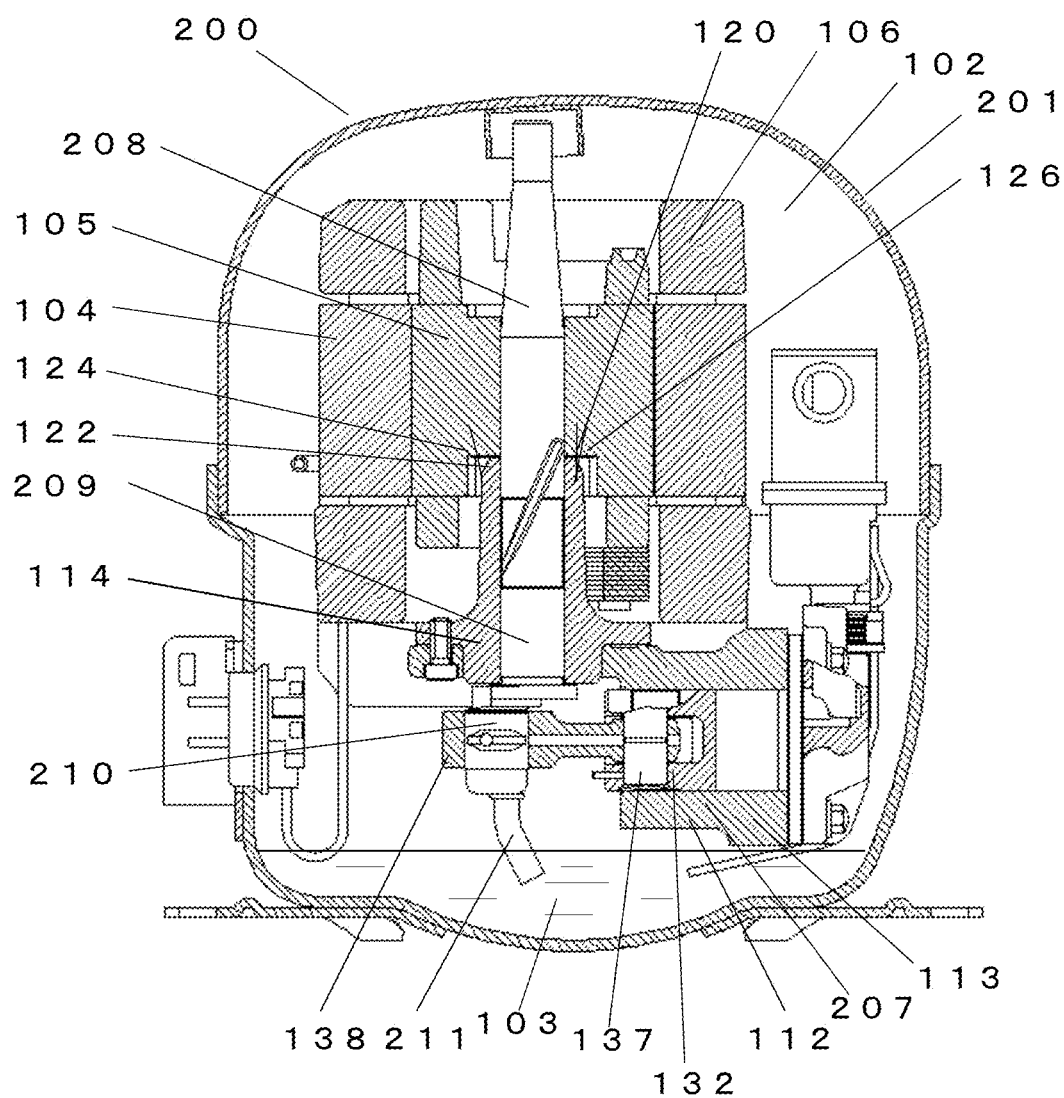
FIG. 8 is a schematic cross-sectional view of a refrigerant compressor according to Embodiment 2 of the present disclosure.
Figure 9A:
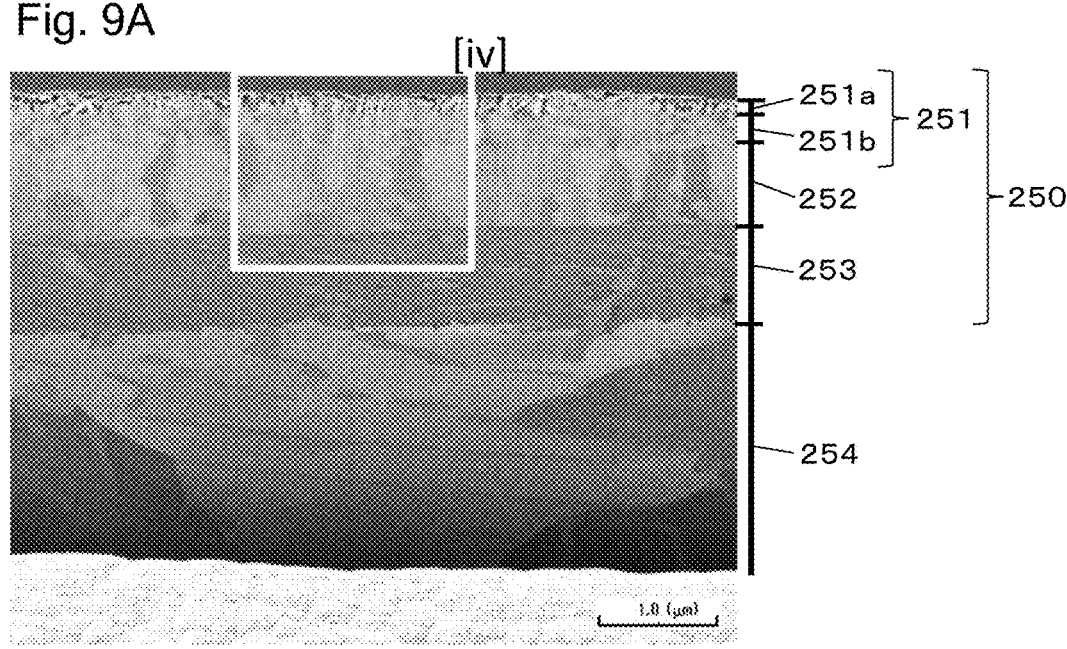
FIGS. 9A and 9B are SIM (scanning ion microscope) images showing an example of a result of SIM observation performed for an oxide coating film according to Embodiment 2.

Firstly, a typical example of the refrigerant compressor according to Embodiment 2 will be specifically described with reference to FIGS. 8 and 9A. FIG. 8 is a cross-sectional view of a refrigerant compressor 200 according to Embodiment 2. FIG. 9A is a SIM (scanning ion microscope) image showing the image of the whole of an oxide coating film 250 in a thickness direction.

As shown in FIG. 8, in the refrigerant compressor 200, a refrigerant gas 102 comprising R134a is filled inside a sealed container 201, and ester oil as lubricating oil 103 is reserved in the bottom portion of the sealed container 201. Inside the sealed container 201, an electric component 106 including a stator 104 and a rotor 105, and a reciprocating compression component 207 configured to be driven by the electric component 106 are accommodated.

The compression component 207 includes a crankshaft 208, a cylinder block 112, a piston 132, and the like. The configuration of the compression component 207 will be described below.

The crankshaft 208 includes at least a main shaft section 209 to which the rotor 105 is pressingly secured, and an eccentric shaft 210 provided eccentrically with the main shaft section 209. An oil feeding pump 211 is provided at the lower end of the crankshaft 208 and is in communication with the lubricating oil 103. As shown in FIG. 9A, the crankshaft 208 comprises a base material 254 made of gray cast iron (FC cast iron) containing about 2% silicon (Si), and the oxide coating film 250 is provided on the surface of the base material 254.

The cylinder block 112 comprises cast iron. The cylinder block 112 is formed with a bore 113 with a substantially cylindrical shape, and includes a bearing section 114 supporting the main shaft section 209.

The rotor 105 is provided with a flange surface 120. The upper end surface of the bearing section 114 is a thrust surface 122. A thrust washer 124 is disposed between the flange surface 120 and the thrust surface 122 of the bearing section 114. The flange surface 120, the thrust surface 122, and the thrust washer 124 constitute a thrust bearing 126.

The piston 132 is loosely fitted into the bore 113 with a clearance. The piston 132 comprises an iron-based material. The piston 132 forms a compression chamber 134 together with the bore 113. The piston 132 is coupled to the eccentric shaft 210 via a connecting rod 138 as a coupling means by use of a piston pin 137. The end surface of the bore 113 is closed by a valve plate 139.

A head 140 constitutes a high-pressure chamber. The head 140 is secured to the valve plate 139 on a side opposite to the bore 113. A suction tube (not shown) is secured to the sealed container 201 and connected to a low-pressure side (not shown) of a refrigeration cycle. The suction tube leads the refrigerant gas 102 to the inside of the sealed container 201. A suction muffler 142 is retained between the valve plate 139 and the head 140.

The operation of the refrigerant compressor 200 configured as described above will be described below.

Electric power supplied from a power supply utility (not shown) is supplied to the electric component 106, and rotates the rotor 105 of the electric component 106. The rotor 105 rotates the crankshaft 108. An eccentric motion of the eccentric shaft 210 is transmitted to the piston 132 via the connecting rod 138 as the coupling means and the piston pin 137, and drives the piston 132. The piston 132 reciprocates inside the bore 113. The refrigerant gas 102 led to the inside of the sealed container 201 through the suction tube (not shown) is suctioned from the suction muffler 142, and is compressed inside the compression chamber 134.

According to the rotation of the crankshaft 208, the lubricating oil 103 is fed to slide sections by the oil feeding pump 211. The lubricating oil 103 lubricates the slide sections and seals the clearance between the piston 132 and the bore 113.

In recent years, to provide higher efficiency of the refrigerant compressor 200, for example, (1) lubricating oil with a lower viscosity is used as the lubricating oil 103 as described above, or (2) the slide length of the slide sections (a distance for which the slide sections slide) is designed to be shorter. For this reason, slide conditions are getting more harsh. Specifically, there is a tendency that the oil film formed between the slide sections is thinner, or difficult to form.

In addition to the above, in the refrigerant compressor 200, the eccentric shaft 210 of the crankshaft 208 is provided eccentrically with the bearing section 114 of the cylinder block 112, and the main shaft section 209 of the crankshaft 208. In this layout, a fluctuating (variable) load which causes a load fluctuation (change) is applied to regions between the main shaft section 209 of the crankshaft 208, the eccentric shaft 210 and the connecting rod 138, due to a gas pressure of the compressed refrigerant gas 102. With the load fluctuation (change), the refrigerant gas 102 dissolved into the lubricating oil 103 is evaporated into bubbles in repetition, for example, the region between the main shaft section 209 and the bearing section 114. In this way, the bubbles are generated in the lubricating oil 103.

For the above-described reasons, for example, in the slide sections of the main shaft section 209 of the crankshaft 208 and the bearing section 114, the oil film has run out, and the metals of the slide surfaces contact each other more frequently.

However, the slide section of the refrigerant compressor 200, for example, the slide section of the crankshaft 208 as an example of Embodiment 2 comprises the oxide coating film 250 having the above-described configuration (see FIG. 9A). For this reason, even if the oil film has run out more frequently, the abrasion of the slide surface caused by this can be suppressed over a long period of time.

[Configuration of Oxide Coating Film]

Figure 9B:
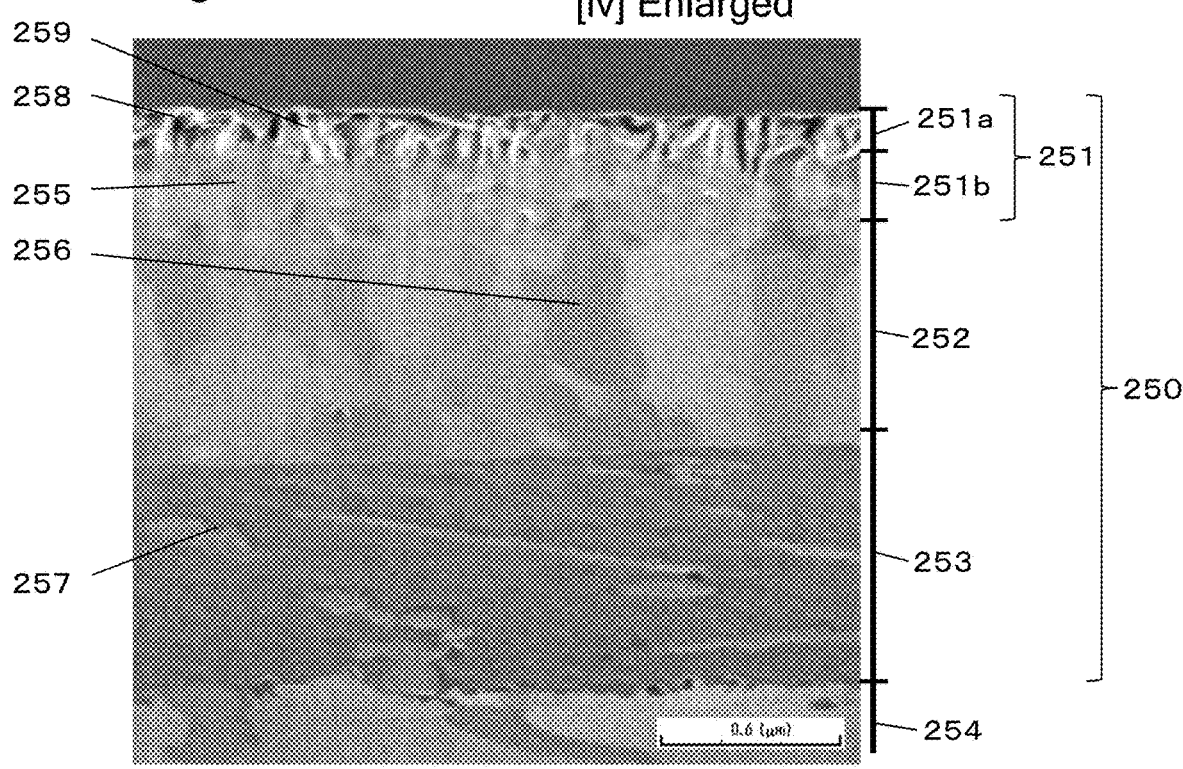

Next, the oxide coating film 250 which can suppress the abrasion of the slide section will be described in more detail with reference to FIGS. 9A and 9B. As described above, FIG. 9A shows the SIM (scanning ion microscope) image showing the image of the whole of the oxide coating film 250 in the thickness direction. FIG. 9B shows the SIM image displaying in an enlarged manner "iv" portion of FIG. 2A.

In Embodiment 1, the crankshaft 208 comprises the base material 254 made of gray cast iron. The oxide coating film 250 is formed on the surface of the base material 254 by oxidation as in Embodiment 1.

In the example of FIG. 9A, the upper side corresponds to the outermost surface, and the lower side corresponds to the base material 254. In the example of FIG. 9A and FIG. 9B which is the enlarged image of FIG. 9A, substantially upward and downward direction will be expressed as "vertical direction", and a direction perpendicular to the vertical direction will be expressed as "horizontal direction."

As shown in FIG. 9A, the oxide coating film 250 according to Embodiment 2 includes at least a first portion 251 containing fine crystals 255, a second portion 252 located under the first portion 251 and containing columnar grains 256 which are vertically elongated, and a third portion 253 located under the second portion 252 and containing layered grains 257 which are horizontally elongated, the first portion 251, the second portion 252, and the third portion 253 being arranged in this order from the outermost surface of the oxide coating film 250. Under the third portion 253, the base material 254 is located. As shown in FIG. 9B, the first portion 251 includes the first a portion 251a and the first b portion 251b which are different from each other in crystal density.

Note that in the SIM observation of the sample (a portion of the crankshaft 208) provided with the oxide coating film 250, a protective resin film is formed on the oxide coating film 250 to protect the sample, as described in Embodiment 1. Therefore, the surface of the oxide coating film 250 is embedded in the resin. In the example of FIGS. 9A and 9B, a portion above the first portion 251 is the protective film.

As shown in FIGS. 9A and 9B, in the oxide coating film 250 according to Embodiment 2, the first portion 251 formed in the outermost surface contains the fine crystals 255 with a grain (particle) diameter of 100 nm or less which are densely arranged, as in the first portion 151 of Embodiment 1.

The first portion 251 can be recognized as "single layer" as in the first portion 151 of Embodiment 1 in that the first portion 251 substantially contains the fine crystals 255. However, as shown in FIG. 9B, regarding the density of the fine crystals 255, the first portion 251 is divided into a first a portion 251a which is closer to the outermost surface and a first b portion 251b which is closer to the base material 254 (second portion 252). The crystal density of the first a portion 251a is lower than that of the first b portion 251b located under the first a portion 251a.

Specifically, as shown in FIG. 9B, the first a portion 251a contains at least the fine crystals 255, and has some voids 258 (black portion in FIG. 9B). The first a portion 251a contains needle-shaped grains 259 which are vertically elongated, and have with a short-diameter length of 100 nm or less and an aspect ratio in a range of 1 to 10. In contrast, the first b portion 251b located under the first a portion 251a does not substantially contain the voids 258 and the needle-shaped grains 259. The first b portion 251b contains nano-level fine crystals 255 which are densely arranged.

As shown in FIGS. 9A and 9B, the second portion 252 is located under the first portion 251 (first b portion 251b). The second portion 252 contains grains with a vertical diameter of about 500 nm to 1 μm and a horizontal diameter of about 100 nm to 150 nm. An aspect ratio obtained by dividing the vertical diameter of the grain by the horizontal diameter of the grain is in a range of about 3 to 10. Therefore, the grains are vertically elongated. From this, it can be seen that the second portion 252 contains numerous columnar grains 256 which are vertically elongated, have a high aspect ratio, and are arranged in the same direction.

As shown in FIGS. 9A and 9B, the third portion 253 is located under the second portion 252. The third portion 253 contains grains with a vertical diameter of several tens nm or less and a horizontal diameter of about several hundreds nm. An aspect ratio obtained by dividing the vertical diameter of the grain by the horizontal diameter of the grain is in a range of 0.01 to 0.1. Therefore, the grains are horizontally elongated. From this, it can be seen that the third portion 253 contains the layered grains 257 which are horizontally elongated and have a low aspect ratio.

The configuration of the oxide coating film 250 according to Embodiment 2 is similar to that of the oxide coating film 150 according to Embodiment 1. Therefore, the oxide coating film 250 can improve the abrasion resistance of the slide member and effectively suppress the attacking characteristic with respect to the other member, as described in Embodiment 1. The refrigerant compressor 200 including the slide member provided with the oxide coating film 250 can realize high efficiency design. Therefore, a sliding loss of the slide section can be reduced, and high reliability and high efficiency can be realized.

In the oxide coating film 250, the first portion 251 comprises at least the first a portion 251a and the first b portion 251b. The voids and/or concave-convex portions are present in spaces formed between the fine crystals 255 of the first a portion 251a, as in the first portion 151 according to Embodiment 1. In particular, the first a portion 251a has voids 258 which are larger than the minute voids of the first portion 151 of Embodiment 1, because of low crystal density of the fine crystals 255. Therefore, even in a situation in which the lubricating oil 103 is not sufficiently fed to the slide section, the lubricating oil 103 can be sufficiently retained in the slide surface. As a result, the slide member can have a high oil retaining capability.

The first a portion 251a contains the voids 258 which contribute to the oil retaining capability and the needle-shaped grains 259. The needle-shaped grains 259 have a hardness lower than that of the fine crystals 255, and therefore, the slide surface including the needle-shaped grains 259 is abraded in a self-sacrificial manner. This slide surface can improve the conformability to the slide surface of the other member. In the refrigerant compressor 200, occurrence of static friction in the slide section is suppressed during start-up, and therefore stable low input can be realized early.

The crystal density of the first b portion 251b located under the first a portion 251a is higher than that of the first a portion 251a. As the grains of the fine crystals 255 arranged densely, the first b portion 251b is denser and higher in mechanical strength than the first a portion 251a. In this structure, the first a portion 251a having a high oil retaining capability is supported by the first b portion 251b having high mechanical strength. Therefore, the first portion 251 can have a higher oil retaining capability and a higher peeling resistance as a whole.

At least one of (preferably both of) the second portion 252 and the third portion 253 is located under the first portion 251, as in the oxide coating film 150 according to Embodiment 1. The columnar grains 256 contained in the second portion 252 and the layered grains 257 contained in the third portion 253 have hardness lower than that of the fine crystals 255 contained in the first portion 251 (The columnar grains 256 and the layered grains 257 are softer than the fine crystals 255).

As described in Embodiment 1, it is considered that during the sliding, the second portion 252 (columnar grains 256) and the third portion 253 (layered grains 257) serve as "buffering material", and the first portion 251 (fine crystals 255) are compressed toward the base material 254. As a result, the attacking characteristic of the oxide coating film 250 with respect to the other member is more suppressed than the other surface treatment films, and the abrasion of the slide surface of the other member can be effectively suppressed.

In the oxide coating film 250 according to Embodiment 2, the upper limit of the grain (particle) diameter of the fine crystals 255 is not limited to 100 nm or less so long as the first portion 251 (the first a portion 251a and the first b portion 251b) contains the grains with the nano-level fine crystals 255 densely arranged. For example, as in the first portion 151 according to Embodiment 1, the grain (particle) diameter of the fine crystals 255 may be in a range of 0.001 μm (1 nm)~1 μm (1000 nm). This makes it possible to obtain the advantages similar to those of Embodiment 1.

The ratio of the voids 258 to the first a portion 251a is desirably 10% or more. This structure allows the oil film to be easily formed on the slide surface (can improve the oil retaining capability of the slide surface) and effectively suppress the attacking characteristic with respect to the other member. In contrast, the ratio of the voids 258 to the first b portion 251b is desirably less than 10%. This is because if the ratio of the voids 258 to the first b portion 251b is too high, the density (mechanical strength) of the grains is not sufficiently increased, and the first b portion 251b may not sufficiently support the first a portion 251a, although this depends on a comparison with the first a portion 251a.

Regarding the first portion 251, as a boundary (border) value (or threshold) used to distinguish the first a portion 251a and the first b portion 251b from each other, for example, a volume occupation rate (e.g., 10%) of the voids 258 may be used.

The first a portion 251a contains the needle-shaped grains 259 which are vertically elongated, as well as the fine crystals 255. The aspect ratio of the needle-shaped grains 259 is not particularly limited. In Embodiment 2, the length on the short-diameter side of the needle-shaped grains 259 is 100 nm or less, and the aspect ratio of the needle-shaped grains 259 is in a range of 1 to 10. Alternatively, the aspect ratio of the needle-shaped grains 259 may be in a range of 1 to 1000.

The specific configuration of the oxide coating film 250 is the same as that of the oxide coating film 150 according to Embodiment 1, except that the first portion 251 includes the first a portion 251a and the first b portion 251b which are different from each other in crystal density. Therefore, the oxide coating film 250 will not be described in detail. Except the above-described difference, the description of the oxide coating film 150 of Embodiment 1 can be incorporated herein to describe the configuration of the oxide coating film 250. Further, the first portion 251 may include a portion which is other than the first a portion 251a and the first b portion 251b and is different in crystal density from the first a portion 251a and the first b portion 251b.

As described above, in Embodiment 2, at least one of the slide members of the refrigerant compressor 200 is made of the iron-based material, and the oxide coating film 250 including the first portion 251 containing the fine crystals 255, the second portion 252 containing the columnar grains 256, and the third portion 253 containing the layered grains 257 is formed on the slide surface of this iron-based material, the first portion 251 including at least the first a portion 251a and the first b portion 251b which are different from each other in crystal density.

With this structure, the abrasion resistance of the slide member can be increased, and the attacking characteristic of the slide member with respect to the other member can be effectively suppressed. This makes it possible to realize high efficiency design of the refrigerant compressor 200 (design in which the viscosity of the lubricating oil 103 is reduced, and the slide length of the slide sections (a distance for which the slide sections slide) is designed to be shorter), which was difficult in the case of the conventional surface treatment film. As a result, in the refrigerant compressor 200, a sliding loss of the slide section can be reduced, and high reliability and high efficiency can be achieved.

Embodiment 3

In Embodiment 3, an example of a refrigeration (freezing) device including the refrigerant compressor 100 of Embodiment 1 or the refrigerant compressor 200 of Embodiment 2 will be specifically described with reference to FIG. 10.

Figure 10:
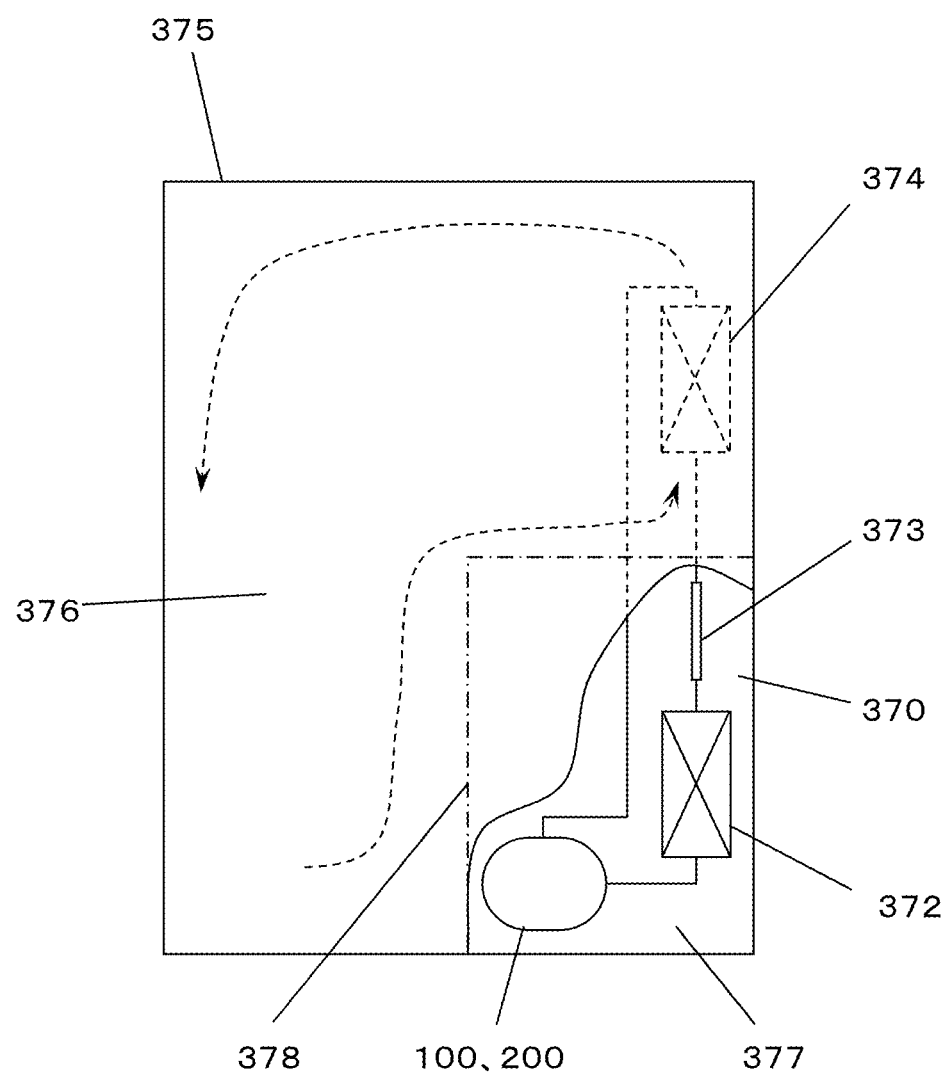
FIG. 10 is a schematic view of a refrigeration device according to Embodiment 3 of the present disclosure.
Figure 11:
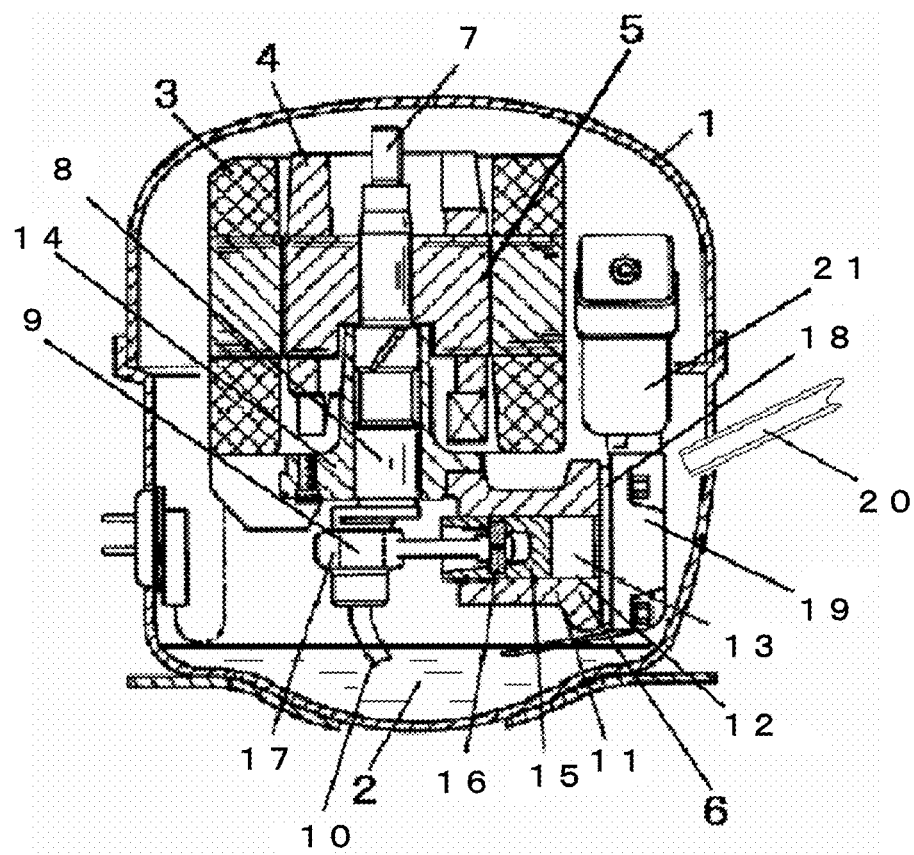
FIG. 11 is a schematic cross-sectional view of a conventional refrigerant compressor.

FIG. 10 is a schematic view of a refrigeration device including the refrigerant compressor 100 according to Embodiment 1 or the refrigerant compressor 200 according to Embodiment 2. In Embodiment 3, only the schematic basic configuration of the refrigeration device will be described.

As shown in FIG. 10, the refrigeration device according to Embodiment 3 includes a body 375, a partition wall 378, a refrigerant circuit 370, and the like. The body 375 is formed by, for example, a heat insulating casing and doors. A surface of the casing opens and the doors are provided to open and close the opening of the casing. The inside of the body 375 is divided by the partition wall 378 into an article storage space 376 and a mechanical room 377. Inside the storage space 376, a blower (not shown) is provided. Alternatively, the inside of the body 375 may be divided into spaces other than the storage space 376 and the mechanical room 377.

The refrigerant circuit 370 is configured to cool the inside of the storage space 376. The refrigerant circuit 370 includes, for example, the refrigerant compressor 100 of Embodiment 1, a heat radiator 372, a pressure reducing unit 373, and a heat absorber 374 which are annularly coupled to each other by pipes. The heat absorber 374 is disposed in the storage space 376. Cooling heat of the heat absorber 374 is agitated by the blower (not shown) and circulated through the inside of the storage space 376 as indicated by broken-line arrows shown in FIG. 10. In this way, the inside of the storage space 376 is cooled.

The refrigerant compressor 100 included in the refrigerant circuit 370 includes the slide member made of the iron-based material, and the oxide coating film 160 is formed on the slide surface of this slide member, as described in Embodiment 1. Instead of the refrigerant compressor 100, the refrigerant circuit 370 may include the refrigerant compressor 200 of Embodiment 2. The refrigerant compressor 200 includes the slide member made of the iron-based material, and the oxide coating film 260 is formed on the slide surface of this slide member, as in the refrigerant compressor 100.

As described above, the refrigeration device according to Embodiment 3 includes the refrigerant compressor 100 according to Embodiment 1 (or the refrigerant compressor 200 according to Embodiment 2). The slide section included in the refrigerant compressor 100 (or the refrigerant compressor 200) can have a high abrasion resistance of its slide surface and suppress the attacking characteristic with respect to the other member. The refrigerant compressor 100 according to Embodiment 1 (or the refrigerant compressor 200 according to Embodiment 2) can reduce a sliding loss of the slide section, and achieve high reliability and high efficiency. As a result, the refrigeration device according to Embodiment 3 can reduce electric power consumption, and realize energy saving.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

As described above, the present invention can provide a refrigerant compressor which can obtain high reliability under a condition in which it uses lubricating oil with a low viscosity, and a refrigeration device using this refrigerant compressor. Therefore, the present invention is widely applicable to devices using refrigeration cycles.

REFERENCE SIGNS LIST 100 refrigerant compressor
101 sealed container
103 lubricating oil
106 electric component
107 compression component
108 crankshaft (slide member)
150 oxide coating film
151 first portion
152 second portion
153 third portion
154 base material
155 fine crystal
156 columnar grains
157 layered grains
200 refrigerant compressor
201 sealed container
250 oxide coating film
251 first portion
251a first a portion
251b first b portion
252 second portion
253 third portion
254 base material
255 fine crystals
256 columnar grains
257 layered grains
258 voids
259 needle-shaped grains
370 refrigerant circuit
372 heat radiator
373 pressure reducing unit
374 heat absorber

The invention claimed is:

1. A refrigerant compressor comprising:
an electric component; and
a compression component which is driven by the electric component and compresses a refrigerant,
wherein at least one of slide members included in the compression component is made of an iron-based material, and an oxide coating film is provided on a slide surface of the iron-based material, the oxide coating film including a first portion containing at least crystals having a crystal grain size in a range of 0.001 μm to 1 μm, a second portion containing columnar grains, and a third portion containing layered grains, and
wherein the oxide coating film comprises at least the first portion located in an outermost surface of the oxide coating film, the second portion located under the first portion, and the third portion located under the second portion.

2. The refrigerant compressor according to claim 1,
wherein the crystal grain size of the first portion is smaller than a crystal grain size of the second portion.

3. The refrigerant compressor according to claim 2,
wherein the third portion contains crystal grains which are horizontally elongated and have an aspect ratio, the aspect ratio is equal to or more than 0.01 and less than 1.

4. The refrigerant compressor according to claim 1,
wherein the first portion includes at least a first a portion and a first b portion which are different from each other in crystal density.

5. The refrigerant compressor according to claim 4,
wherein the first a portion is located closer to an outermost surface of the oxide coating film, and the first b portion is located under the first a portion, and
wherein the crystal density of the first a portion is lower than the crystal density of the first b portion.

6. The refrigerant compressor according to claim 4,
wherein the first a portion contains needle-shaped grains which are vertically elongated and have an aspect ratio, the aspect ratio is more than 1 and less than 1000.

7. The refrigerant compressor according to claim 1,
wherein the second portion contains crystal grains which are vertically elongated and have an aspect ratio, the aspect ratio is more than 1 and less than 20.

8. The refrigerant compressor according to claim 1,
wherein the oxide coating film contains iron, oxygen and silicon.

9. The refrigerant compressor according to claim 1,
wherein the oxide coating film has a thickness in a range of 1 to 5 μm.

10. The refrigerant compressor according to claim 1,
wherein the refrigerant is a HFC-based refrigerant such as R134a, or a mixed refrigerant of the HFC-based refrigerant, and a lubricating oil is one of ester oil, alkylbenzene oil, polyvinyl ether, and polyalkylene glycol, or mixed oil including any of ester oil, alkylbenzene oil, polyvinyl ether, and polyalkylene glycol.

11. The refrigerant compressor according to claim 1,
wherein the refrigerant is a natural refrigerant such as R600a, R290, or R744, or a mixed refrigerant including any of the natural refrigerants, and a lubricating oil is one of mineral oil, ester oil, alkylbenzene oil, polyvinyl ether, and polyalkylene glycol, or mixed oil including any of mineral oil, ester oil, alkylbenzene oil, polyvinyl ether, and polyalkylene glycol.

12. The refrigerant compressor according to claim 1, wherein the refrigerant is a HFO-based refrigerant such as R1234yf, or a mixed refrigerant of the HFO-based refrigerant, and a lubricating oil is one of ester oil, alkylbenzene oil, polyvinyl ether, and polyalkylene glycol, or mixed oil including any of ester oil, alkylbenzene oil, polyvinyl ether, and polyalkylene glycol.

13. The refrigerant compressor according to claim 1, wherein the electric component is inverter-driven at one of a plurality of operating frequencies.

14. A refrigeration device comprising:
a refrigerant circuit including the refrigerant compressor according to claim 1, a heat radiator, a pressure reducing unit, and a heat absorber, which are annularly coupled to each other via a pipe.

* * * * *